(12) United States Patent
Nagamine

(10) Patent No.: US 11,415,907 B2
(45) Date of Patent: Aug. 16, 2022

(54) OPTICAL HEAD, IMAGE FORMING APPARATUS, IMAGE READING APPARATUS, AND METHOD OF PRODUCING OPTICAL HEAD

(71) Applicant: Oki Electric Industry Co., Ltd., Tokyo (JP)

(72) Inventor: Masamitsu Nagamine, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/317,275

(22) Filed: May 11, 2021

(65) Prior Publication Data

US 2021/0356627 A1 Nov. 18, 2021

(30) Foreign Application Priority Data

May 13, 2020 (JP) .............................. JP2020-084446

(51) Int. Cl.
| | | |
|---|---|---|
| *G03G 15/04* | (2006.01) | |
| *B41J 2/00* | (2006.01) | |
| *H04N 1/00* | (2006.01) | |
| *G02B 3/00* | (2006.01) | |
| *H04N 1/031* | (2006.01) | |
| *H04N 1/191* | (2006.01) | |
| *B41J 2/45* | (2006.01) | |

(52) U.S. Cl.
CPC .......... *G03G 15/04054* (2013.01); *B41J 2/45* (2013.01); *B41J 2/451* (2013.01); *G02B 3/005* (2013.01); *H04N 1/0311* (2013.01); *H04N 1/191* (2013.01); *G03G 2215/0409* (2013.01)

(58) Field of Classification Search
CPC ....... G03G 15/04054; G03G 15/04063; G03G 2215/0407; G03G 2215/0409; G03G 2215/0412; G02B 3/005; G02B 3/0012; G02B 3/0062; G02B 7/025; H04N 1/191; B41J 2/45; B41J 2/451
See application file for complete search history.

(56) References Cited

U.S. PATENT DOCUMENTS

| | | | | |
|---|---|---|---|---|
| 2012/0075403 | A1* | 3/2012 | Nagamine | ................... B41J 2/45 347/242 |
| 2014/0160218 | A1* | 6/2014 | Tajima | ............... G03G 15/0435 347/118 |
| 2017/0184994 | A1* | 6/2017 | Imai | ................... G03G 15/04036 |
| 2018/0149995 | A1* | 5/2018 | Fuyuno | ................... G03G 15/011 |
| 2019/0361368 | A1* | 11/2019 | Kida | ................... G03G 15/04036 |
| 2019/0391508 | A1* | 12/2019 | Nakamichi | ....... G03G 15/04036 |

FOREIGN PATENT DOCUMENTS

JP  2010204208 A  9/2010

* cited by examiner

*Primary Examiner* — Robert B Beatty
(74) *Attorney, Agent, or Firm* — Rabin & Berdo, P.C.

(57) ABSTRACT

An optical head comprises a substrate on which optical elements are arranged in a main scanning direction, a lens unit that transmits light emitted from the optical elements or light entering the optical elements, and a holder that holds the lens unit. The holder has a sidewall extending in the main scanning direction. The sidewall has a hole at a position facing the lens unit. A fixing member is provided in the hole. The fixing member fixes the lens unit to the sidewall.

14 Claims, 23 Drawing Sheets

OPTICAL HEAD, IMAGE FORMING APPARATUS, IMAGE READING APPARATUS, AND METHOD OF PRODUCING OPTICAL HEAD

BACKGROUND OF THE INVENTION

1. Field of the Invention

The present disclosure relates to an optical head, an image forming apparatus, an image reading apparatus, and a method of producing the optical head.

2. Description of the Related Art

An exposure head used in an image forming apparatus includes a substrate, a lens unit, and a holder holding the substrate and the lens unit. Light emitting elements are arranged in a main scanning direction on the substrate. Light emitted from the light emitting elements passes through the lens unit. See, for example, Japanese Patent Application Publication No. 2010-204208 (see FIG. 1).

In such an exposure head, misalignment between the light emitting elements on the substrate and lens elements of the lens unit may cause degradation of image quality.

SUMMARY OF THE INVENTION

An object of the present disclosure is to suppress degradation of image quality.

In the present disclosure, there is provided an optical head including a substrate on which optical elements are arranged in a main scanning direction, a lens unit that transmits light emitted from the optical elements or light entering the optical elements, and a holder that holds the lens unit. The holder has a sidewall extending in the main scanning direction. The sidewall has a hole at a position facing the lens unit. A fixing member is provided in the hole. The fixing member fixes the lens unit to the sidewall.

In another aspect of the present disclosure, there is provide an image forming apparatus including an exposure head constituted by the above described optical head, an image bearing body provided to face the exposure head, a developing portion that develops an image formed on the image bearing body by the exposure head, and a transfer portion that transfers the image developed by the developing portion to a medium.

In still another aspect of the present disclosure, there is provided an image reading apparatus including a reading head constituted by the above described optical head, and a platen that holds a document at a position facing the reading head.

In yet another aspect of the present disclosure, there is provided a method of producing an optical head including a substrate on which a plurality of optical elements are arranged in a main scanning direction, a lens unit transmitting light emitted from the optical elements or light entering the optical elements, and a holder holding the substrate and the lens unit. The method of producing the optical head includes the steps of positioning the lens unit relative to the holder in the main scanning direction, fixing the substrate to the holder, adjusting a position of the lens unit relative to the holder in a sub-scanning direction perpendicular to the main scanning direction, and fixing the lens unit to the holder with a fixing member through a hole provided in the holder.

According to the present disclosure, the lens unit can be fixed to the holder after the position of the lens unit is adjusted. Thus, misalignment between the optical elements on the substrate and lens elements of the lens unit can be suppressed, and degradation of image quality can be suppressed.

DETAILED DESCRIPTION OF THE INVENTION (Image Forming Apparatus)

Figure 1:
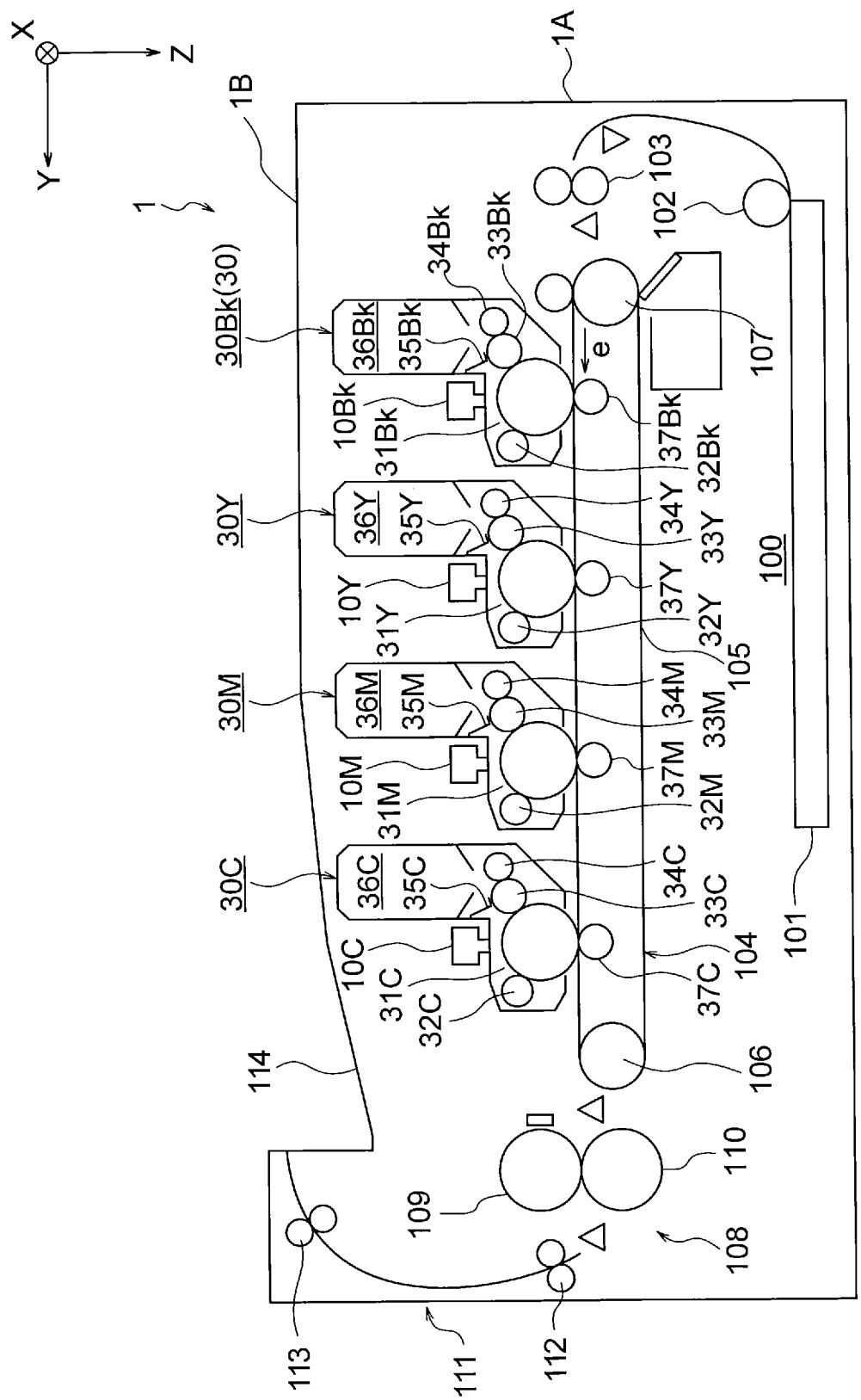
FIG. 1 illustrates an image forming apparatus including exposure heads of an embodiment.

An image forming apparatus 1 (more specifically, an LED printer) of the embodiment will now be described. FIG. 1 illustrates the image forming apparatus 1 of the embodiment. The image forming apparatus 1 is configured to form images using electrophotography, and is, for example, a color printer.

The image forming apparatus 1 includes a medium supply portion 100, process units 30Bk, 30Y, 30M, and 30C, a transfer unit 104, a fixing device 108, and a medium ejection portion 111. The process units 30Bk, 30Y, 30M, and 30C serve as image forming units, and are configured to form images of black (Bk), yellow (Y), magenta (M), and cyan (C), respectively. The transfer unit 104 is configured to transfer the images to a medium P. The fixing device 108 is configured to fix the images to the medium P. The medium ejection portion 111 is configured to eject the medium P.

These components are housed in a housing 1A. An openable top cover 1B is disposed on an upper part of the housing 1A.

The medium supply portion 100 includes a medium cassette 101, a hopping roller 102, and a pair of conveying rollers 103. The medium cassette 101 stores the media P such as printing sheets. The hopping roller 102 feeds the medium P one by one out of the medium cassette 101. The conveying rollers 103 transport the medium P fed by the hopping roller 102 toward a conveying belt 105. The medium P may be a printing sheet, an overhead projector (OHP) sheet, an envelope, a copying paper, a special paper, or the like.

The process units 30Bk, 30Y, 30M, and 30C are arranged along a conveying path of the medium P from the upstream side to the downstream side (right to left in FIG. 1).

The process units 30Bk, 30Y, 30M, and 30C include cylindrical photosensitive drums 31Bk, 31Y, 31M, and 31C, charging rollers 32Bk, 32Y, 32M, and 32C, and developing rollers 33Bk, 33Y, 33M, and 33C. The photosensitive drums 31Bk, 31Y, 31M, and 31C serve as image bearing bodies. The charging rollers 32Bk, 32Y, 32M, and 32C serve as charging members for uniformly charging the surfaces of the photosensitive drums 31Bk, 31Y, 31M, and 31C. The developing rollers 33Bk, 33Y, 33M, and 33C serve as developer bearing bodies (developing portions) for forming toner images (developer images) by attaching toners (developers) of the respective colors to electrostatic latent images formed on the surfaces of the photosensitive drums 31Bk, 31Y, 31M, and 31C.

Toner supplying rollers 34Bk, 34Y, 34M, and 34C and developing blades 35Bk, 35Y, 35M, and 35C are disposed in contact with the developing rollers 33Bk, 33Y, 33M, and 33C. The toner supplying rollers 34Bk, 34Y, 34M, and 34C serve as supplying members for supplying toners to the developing rollers 33Bk, 33Y, 33M, and 33C. The developing blades 35Bk, 35Y, 35M, and 35C serve as regulating members for regulating the thicknesses of the toner layers on the surfaces of the developing rollers 33Bk, 33Y, 33M, and 33C. Toner cartridges 36Bk, 36Y, 36M, and 36C are attached above the toner supplying rollers 34Bk, 34Y, 34M, and 34C. The toner cartridges 36Bk, 36Y, 36M, and 36C serve as developer containers from which toners are supplied.

Exposure heads 10Bk, 10Y, 10M, and 10C serving as optical heads (or print heads) are disposed above the process units 30Bk, 30Y, 30M, and 30C so as to face the photosensitive drums 31Bk, 31Y, 31M, and 31C. The exposure heads 10Bk, 10Y, 10M, and 10C are supported by the top cover 1B in a suspended manner.

The transfer unit 104 includes a conveying belt 105, a drive roller 106, a tension roller 107, and transfer rollers 37Bk, 37Y, 37M, and 37C. The conveying belt 105 serves as a conveying member that runs to transport the medium P adhered to the conveying belt 105. The drive roller 106 drives the conveying belt 105. The tension roller 107 applies tension to the conveying belt 105. The transfer rollers 37Bk, 37Y, 37M, and 37C serving as transfer members are disposed facing the photosensitive drums 31Bk, 31Y, 31M, and 31C via the conveying belt 105. The transfer rollers 37Bk, 37Y, 37M, and 37C transfer the toner images of the respective colors from the photosensitive drums 31Bk, 31Y, 31M, and 31C to the medium P.

The fixing device 108 includes a fixing roller 109 having a heat source and a pressure roller 110 pressed against the surface of the fixing roller 109 to form a fixing nip. The fixing roller 109 and the pressure roller 110 apply heat and pressure to the toner image on the medium P to fix the toner images to the medium P.

The medium ejection portion 111 includes two pairs of ejection rollers 112 and 113 for transporting the medium P from the fixing device 108 and ejecting the medium P through an ejection port. A stacker portion 114 is disposed on the upper surface of the image forming apparatus 1. The medium P ejected by the ejection rollers 112 and 113 are placed on the stacker portion 114.

The image forming operation by the image forming apparatus 1 will now be described. When the image forming operation starts, the hopping roller 102 rotates to feed the medium P out of the medium cassette 101 to the conveying path one by one. The conveying rollers 103 start rotating at a predetermined timing to transport the medium P along the conveying path to the conveying belt 105. The conveying belt 105 runs in the direction indicated by an arrow e by the rotation of the drive roller 106, and transports the medium P adhered to the conveying belt 105.

In the process units 30Bk, 30Y, 30M, and 30C, the surfaces of the photosensitive drums 31Bk, 31Y, 31M, and 31C are uniformly charged by the charging rollers 32Bk, 32Y, 32M, and 32C.

The exposure heads 10Bk, 10Y, 10M, and 10C emit light in accordance with image data of the respective colors. As a result, electrostatic latent images are formed on the photosensitive layers on the surfaces of the photosensitive drums 31Bk, 31Y, 31M, and 31C.

The electrostatic latent images formed on the surfaces of the photosensitive drums 31Bk, 31Y, 31M, and 31C are developed into toner images by the developing rollers 33Bk, 33Y, 33M, and 33C. As the conveying belt 105 runs, the medium P passes through between the process units 30Bk, 30Y, 30M, and 30C and the transfer rollers 37Bk, 37Y, 37M, and 37C. The toner images on the surfaces of the photosensitive drums 31Bk, 31Y, 31M, and 31C are transferred to the medium P on the conveying belt 105.

The medium P to which the toner image is transferred is transported to the fixing device 108. At the fixing device 108, the toner image is heated and pressed by the fixing roller 109 and the pressure roller 110 so that the toner image is molten and fixed to the medium P. The medium P to which the toner image is fixed is ejected to the outside of the image forming apparatus 1 by the ejection rollers 112 and 113, and is placed on the stacker portion 114. This completes the image forming operation.

In the following description, the exposure heads 10Bk, 10Y, 10M, and 10C will be each referred to as "exposure head 10" when there is no particular need to distinguish them. Similarly, the process units 30Bk, 30Y, 30M, and 30C will be each referred to as a "process unit 30" when there is no particular need to distinguish them. The photosensitive drums 31Bk, 31Y, 31M, and 31C will be each referred to as a "photosensitive drum 31" when there is no particular need to distinguish them.

In FIG. 1, the axial direction of the photosensitive drums 31Bk, 31Y, 31M, and 31C is defined as an X direction. The moving direction of the medium P passing through the process units 30Bk, 30Y, 30M, and 30C is defined as a Y direction. A direction perpendicular to both the X direction and the Y direction is defined as a Z direction.

Regarding the Z direction, a direction from the exposure head 10 to the photosensitive drum 31 is defined as a +Z direction, and a direction from the photosensitive drum 31 to the exposure head 10 is defined as a −Z direction.

(Configuration of Exposure Head)

Figure 2:
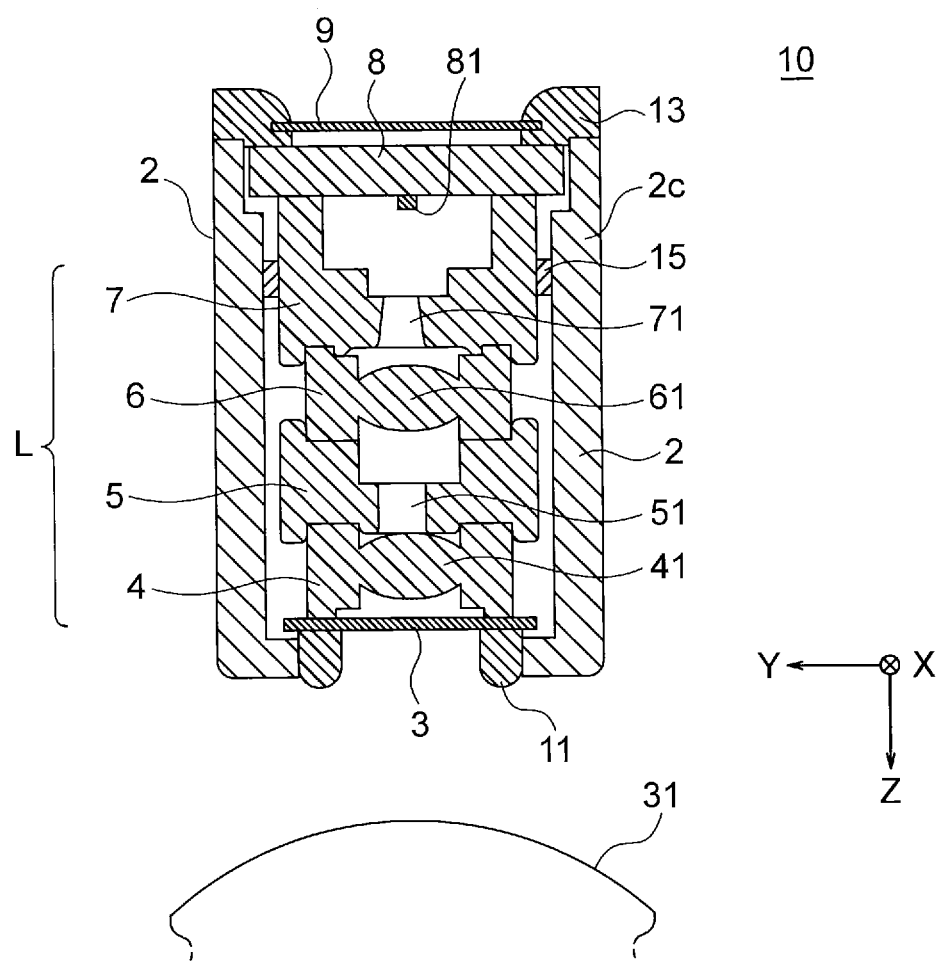
FIG. 2 illustrates the exposure head and a photosensitive drum of the embodiment.
Figure 3:
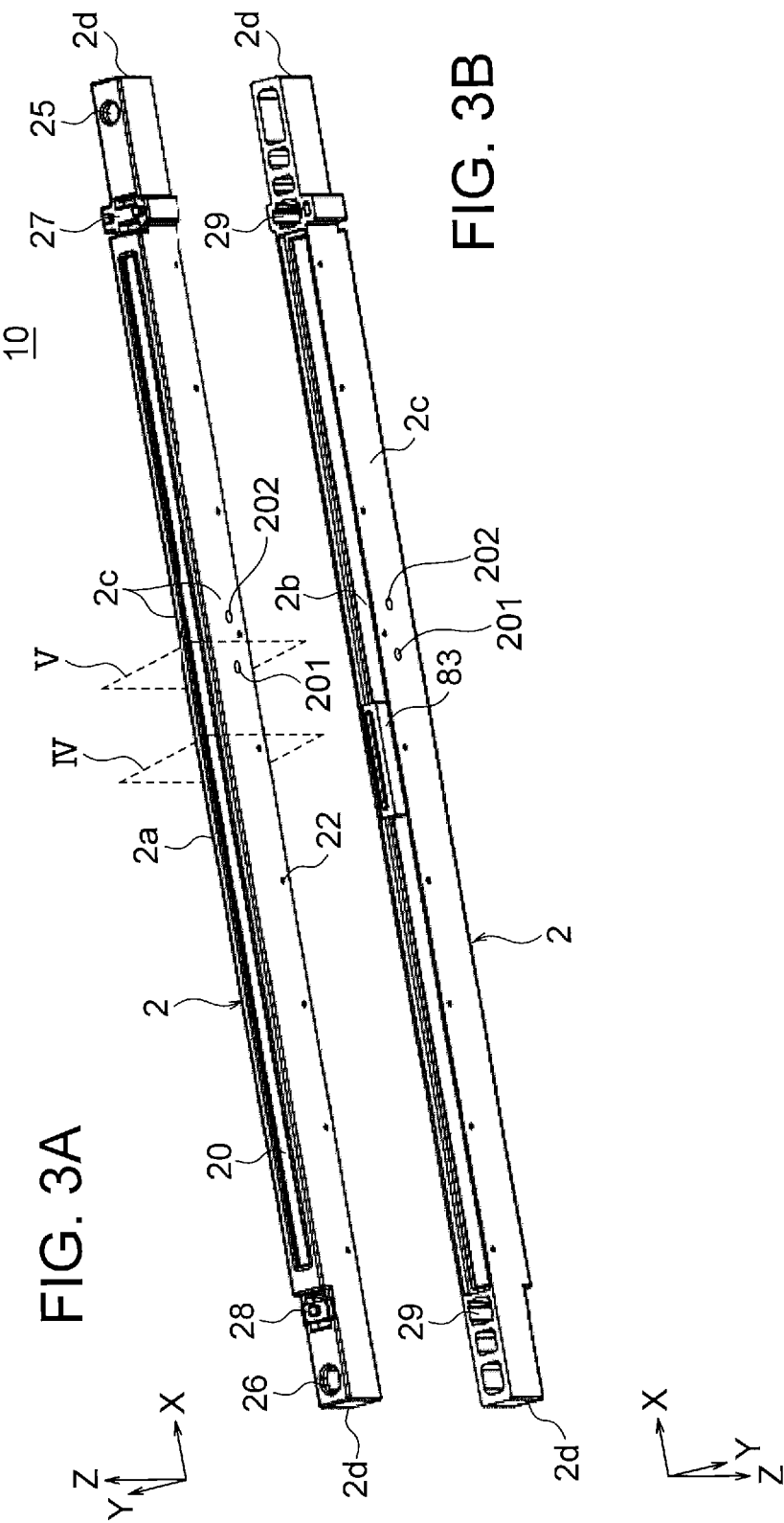
FIG. 3A is a perspective view illustrating the exposure head of the embodiment as viewed from the photosensitive drum side.
FIG. 3B is a perspective view as viewed from the opposite side.
Figure 4:
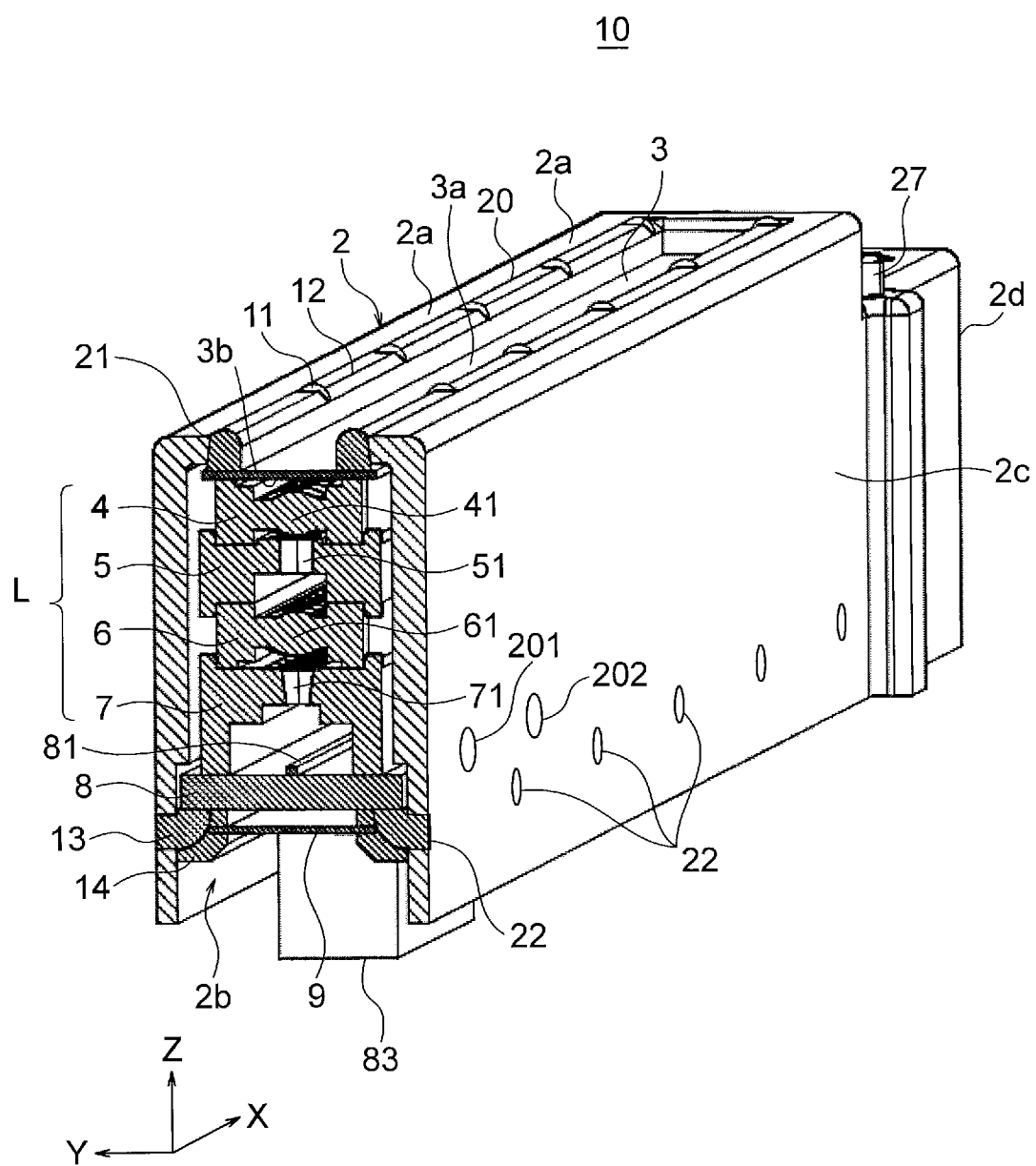
FIG. 4 is a partially sectional perspective view taken along a plane IV in FIG. 3A.
Figure 5:
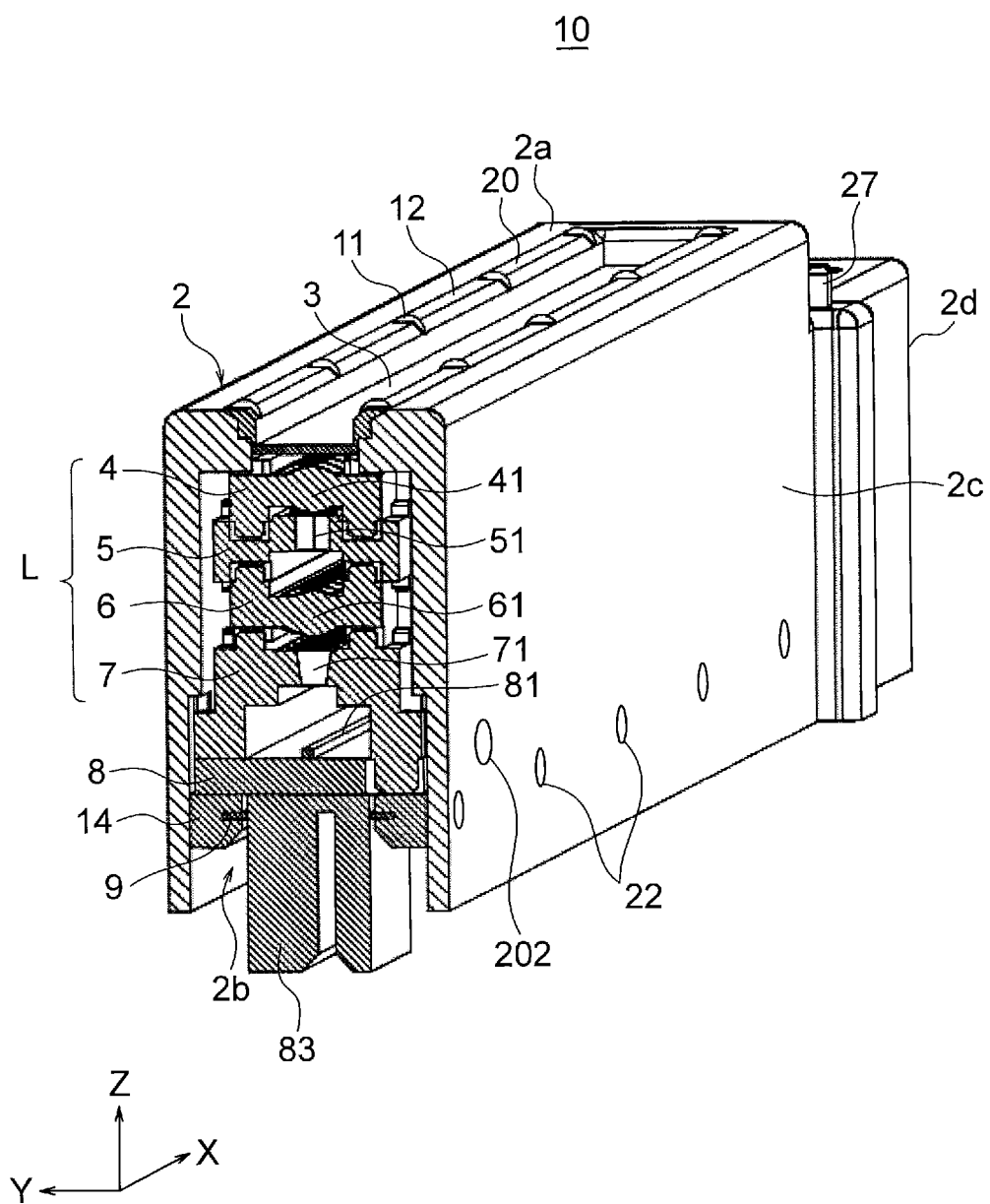
FIG. 5 is a partially sectional perspective view taken along a plane V in FIG. 3A.

FIG. 2 is a cross-sectional view of the exposure head 10 and the photosensitive drum 31. FIG. 3A is a perspective view of the exposure head 10 as viewed from the photosensitive drum 31 side. FIG. 3B is a perspective view of the exposure head 10 as viewed from the opposite side. FIG. 4 is a partially sectional perspective view taken along a plane IV in FIG. 3A. FIG. 5 is a partially sectional perspective view taken along a plane V in FIG. 3A.

The exposure head 10 includes, in order from the side closer to the photosensitive drum 31, a cover 3, a first lens array 4, an intermediate light shielding plate 5 serving as a first light shielding member, a second lens array 6, an incident light shielding plate 7 serving as a second light shielding member, and a substrate 8. The exposure head 10 further includes a holder 2 holding these components.

The first lens array 4 includes lens elements 41 constituted by microlenses. The intermediate light shielding plate 5 has openings 51. The second lens array 6 includes lens elements 61 constituted by microlenses. The incident light shielding plate 7 has openings 71. The substrate 8 includes light emitting elements 81 constituted by light emitting diodes (LEDs) and serving as optical elements.

The light emitting elements 81 are arranged in the X direction as described later. Thus, the X direction is also referred to as a "main scanning direction." The lens elements 41, the openings 51, the lens elements 61, and the openings 71 are arranged in the X direction. The Y direction, which is the direction perpendicular to the X direction, is also referred to as a "sub-scanning direction."

The cover 3, the first lens array 4, the intermediate light shielding plate 5, the second lens array 6, the incident light shielding plate 7, and the substrate 8 are stacked in the Z direction. Among these components, the cover 3 is positioned at an end in the +Z direction (the photosensitive drum 31 side), and the substrate 8 is positioned at an end in the −Z direction.

The cover 3 is fixed to the holder 2 with an adhesive agent 11. The substrate 8 is fixed to the holder 2 with an adhesive agent 13. A space between the cover 3 and an inner periphery of an opening 20 (described later) of the holder 2 is sealed with a sealing resin 12 (FIG. 4).

The first lens array 4, the intermediate light shielding plate 5, the second lens array 6, and the incident light shielding plate 7 constitute a lens unit L. The lens unit L is held between the cover 3 and the substrate 8 in the Z direction. As will be described later, the lens unit L is fixed to the holder 2 with an adhesive agent 15 (FIG. 2) serving as a fixing member after the position of the lens unit L is adjusted in the Y direction.

Each light emitting element 81 of the substrate 8 emits light in the +Z direction. The light from the light emitting element 81 passes through the opening 71 of the incident light shielding plate 7, the lens element 61 of the second lens array 6, the opening 51 of the intermediate light shielding plate 5, the lens element 41 of the first lens array 4, and the cover 3, and is focused on the surface of the photosensitive drum 31.

An insulating film 9 is disposed on the −Z side of the substrate 8. The insulating film 9 is fixed to the holder 2 with the adhesive agent 13 (FIG. 4). A periphery of the insulating film 9 is sealed with a sealing resin 14 (FIG. 4).

In the following description, the holder 2, the cover 3, the first lens array 4, the intermediate light shielding plate 5, the second lens array 6, the incident light shielding plate 7, and the substrate 8 of the exposure head 10 will be described in this order.

(Configuration of Holder 2)

Figure 6:
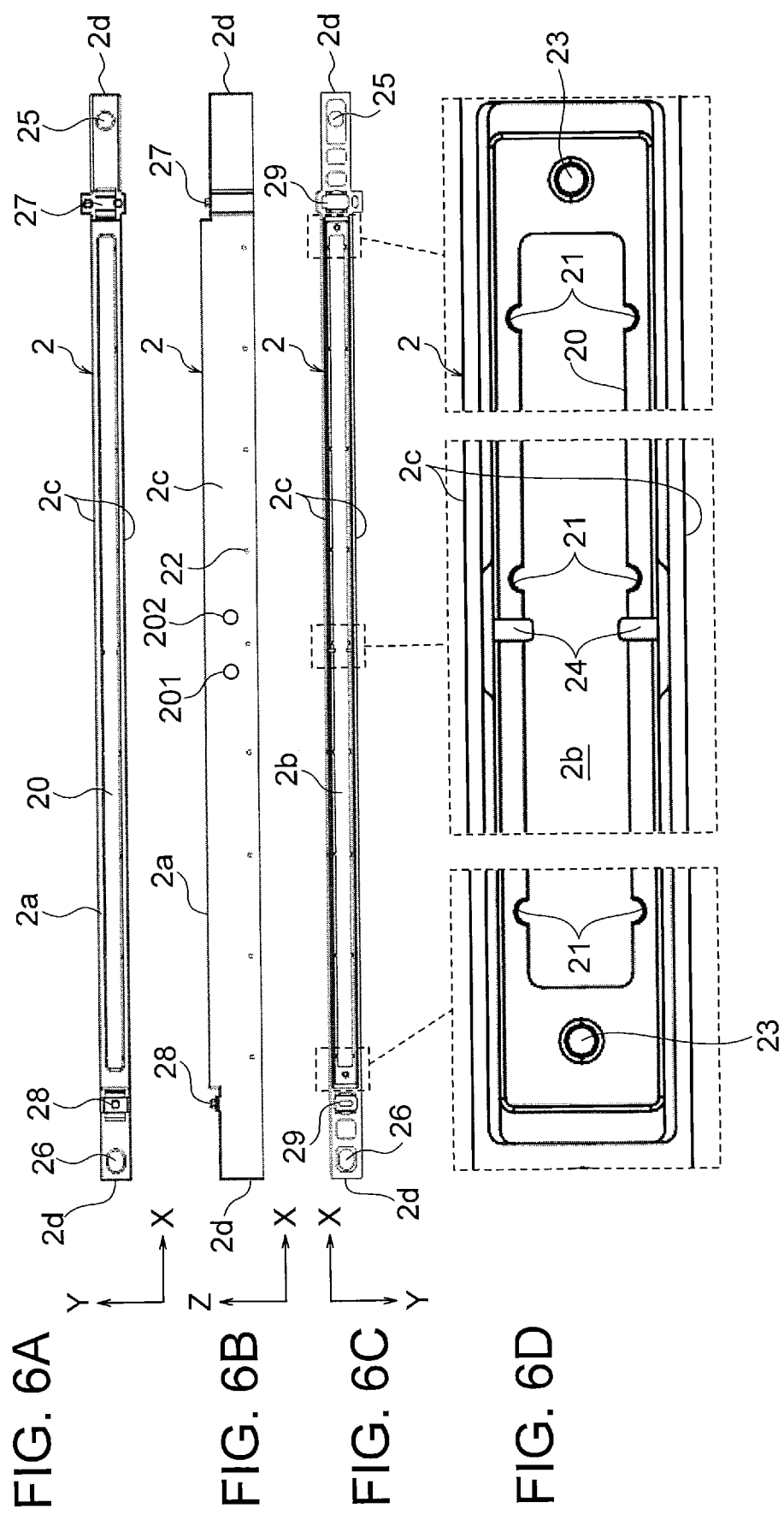
FIG. 6A is a plan view of a holder of the exposure head of the embodiment.
FIG. 6B is a side view of the holder.
FIG. 6C is a bottom view of the holder.
FIG. 6D is an enlarged bottom view of the holder.

The configuration of the holder 2 will now be described. FIG. 6A is a plan view of the holder 2. FIG. 6B is a side view of the holder 2. FIG. 6C is a bottom view of the holder 2. In this regard, the plan view is a view as viewed from the +Z side, and the bottom view is a view as viewed from the −Z side. FIG. 6D is an enlarged bottom view of the holder 2 illustrated in FIG. 6C, specifically, an end portion in the −X direction, a center portion in the X direction, and an end portion in the +X direction of the holder 2.

The holder 2 holds the cover 3, the first lens array 4, the intermediate light shielding plate 5, the second lens array 6, the incident light shielding plate 7, and the substrate 8. The holder 2 is formed by, for example, injection molding of resin such as a liquid crystal polymer.

As illustrated in FIGS. 6A to 6C, the holder 2 has a top plate portion (supporting portion) 2a, two sidewalls 2c, and two end surface portions 2d. The top plate portion 2a is located at the end in the +Z direction of the holder 2. The sidewalls 2c are located at both ends in the Y direction of the holder 2. The end surface portions 2d are located at both ends in the X direction of the holder 2. The end in the −Z direction of the holder 2 is an open end 2b.

As illustrated in FIG. 6A, the top plate portion 2a of the holder 2 has an opening 20. The opening 20 transmits light that has passed through the lens arrays 4 and 6.

A substantially circular hole 25 is formed at the end in the +X direction of the top plate portion 2a, and an elongated hole 26 is formed at the end in the −X direction of the top plate portion 2a. The elongated hole 26 is elongated in the X direction. The hole 25 and the elongated hole 26 engage with protrusions provided on a casing of the process unit 30 to thereby position the holder 2 in the XY plane.

The top plate portion 2a has contact portions 27 and 28 formed on the inner sides in the X direction with respect to the hole 25 and the elongated hole 26. The contact portions 27 and 28 come into contact with contact portions provided on the casing of the process unit 30 in the Z direction to thereby position the holder 2 in the Z direction.

As illustrated in FIG. 6B, each sidewall 2c of the holder 2 has holes 22 formed at regular intervals in the X direction. The adhesive agent 13 (FIG. 4) for fixing the substrate 8 to the holder 2 is supplied through the holes 22.

In this example, nine holes 22 are formed at regular intervals in the X direction on each sidewall 2c. FIG. 4 described above is a cross-sectional view of the exposure head 10 taken along a plane IV (FIG. 3A) passing through the holes 22 in the middle. FIG. 5 is a cross-sectional view taken along a plane V (FIG. 3A) shifted from the holes 22 in the middle.

Holes 201 and 202 are formed in each sidewall 2c of the holder 2. The holes 201 and 202 are located at the substantial center in the X direction of each sidewall 2c. The holes 201 and 202 are arranged adjacent to each other in the X direction. The hole 201 is located on the −X side, and the hole 202 is located on the +X side. The hole 201 is also referred to as a "first hole," and the hole 202 is also referred to as a "second hole."

As illustrated in FIG. 4, the holes 201 and 202 are formed at positions facing side surface portions 7c (described later) of the incident light shielding plate 7.

The holes 202 are through-holes through which jigs are inserted when the position of the lens unit L is adjusted as described later. The holes 201 are through-holes through which the adhesive agent 15 is supplied to fix the lens unit L after the position adjustment. The positions of the holes 201 and 202 may be reversed to each other.

As illustrated in FIG. 6D, a plurality of cutout portions 21 are formed on the inner periphery of the opening 20 of the top plate portion 2a. The cutout portions 21 are formed at regular intervals in the X direction on each of the end edges of the opening 20 in the Y direction. The adhesive agent 11 (FIG. 4) for fixing the cover 3 to the holder 2 is supplied through the cutout portions 21.

Two pins 23 protruding in the −Z direction are formed on the surface on the −Z side of the top plate portion 2a of the holder 2. The pins 23 have, for example, a cylindrical shape and are formed on both sides in the X direction of the opening 20. The pins 23 engage with grooves 42 (described later) of the first lens array 4. The pins 23 correspond to position-restricting portions for positioning the lens unit L in the Y direction at both ends in the X direction of the lens unit L.

Two projections 24 (see FIG. 13) projecting in the −Z direction are formed at the center portion in the X direction of the top plate portion 2a. The projections 24 are formed on both sides in the Y direction of the opening 20. The projections 24 engage with recesses 44 (described later) of the first lens array 4. The projections 24 correspond to position-restricting portions for positioning the lens unit L in the X direction.

As illustrated in FIG. 6C, two engaging portions 29 are formed on both sides in the X direction of the open end 2b of the holder 2. The engaging portions 29 engage with pressing members (coil springs) of the image forming apparatus 1. The pressing members press the holder 2 in the +Z direction and bring the contact portions 27 and 28 (FIG. 6A) into contact with the contact portions of the image forming apparatus 1. As a result, the holder 2 is positioned in the Z direction.

(Configuration of Cover 3)

The configuration of the cover 3 will now be described. The cover 3 illustrated in FIG. 4 is a rectangular film that transmits light, and is composed of, for example, polyethylene terephthalate (PET).

The cover 3 has a surface 3a and a back surface 3b. The surface 3a and the back surface 3b are parallel to the XY plane. The back surface 3b of the cover 3 serves as a positional reference for the lens unit L in the Z direction and is hereinafter referred to as the "reference surface 3b."

The area of the cover 3 is larger than that of the opening 20 of the holder 2 and smaller than the inside area of the holder 2. The cover 3 is fixed to the holder 2 with the adhesive agent 11 supplied through the cutout portions 21 of the holder 2. The cover 3 is fixed to the holder 2 so as to close the opening 20.

A cutout portion 3c (FIG. 13) is formed at the center portion in the X direction on each end in the Y direction of the cover 3. The cutout portions 3c are provided to prevent the cover 3 from interfering with the projections 24 of the holder 2.

(Configuration of First Lens Array 4)

Figure 7:
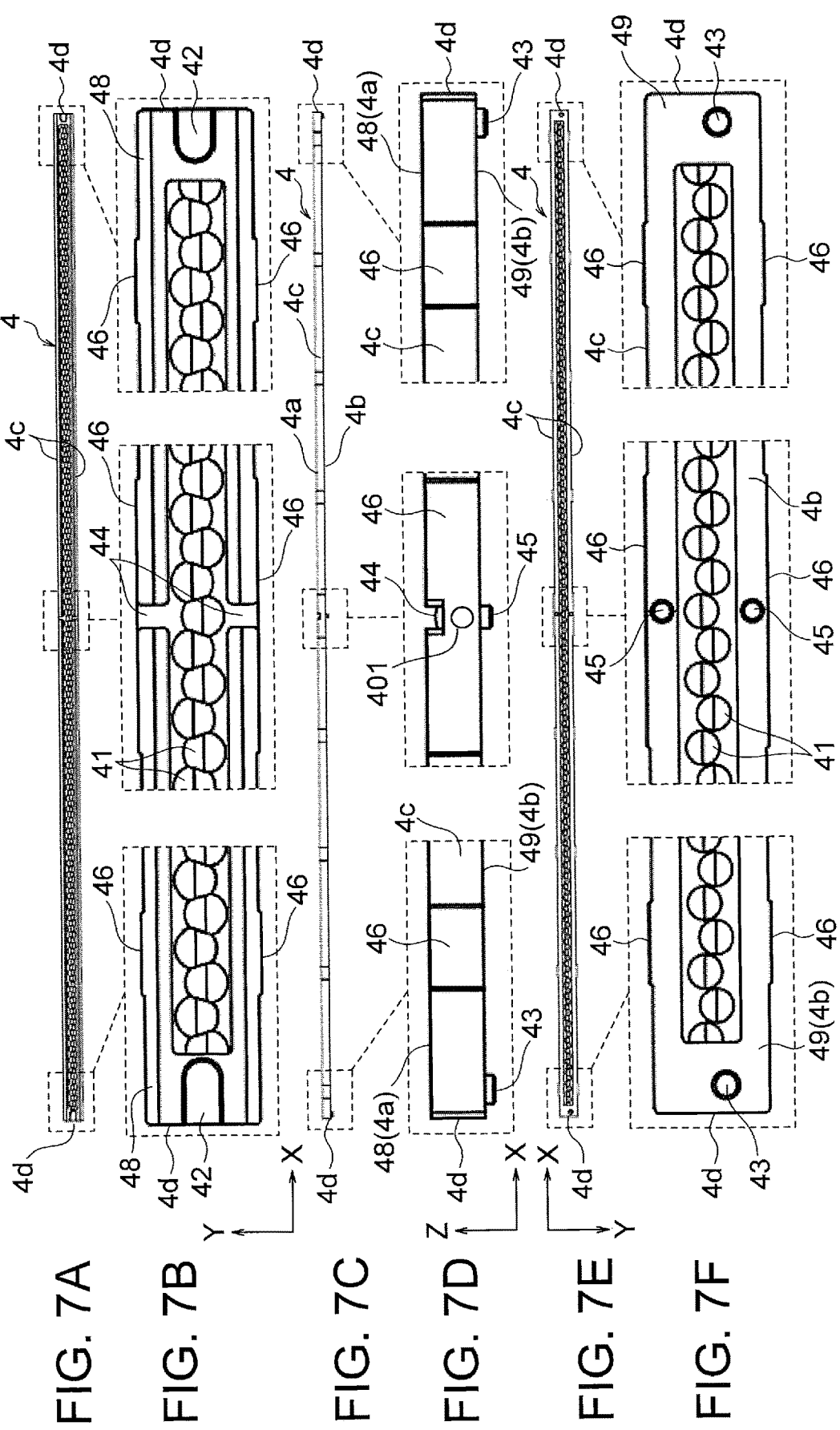
FIG. 7A is a plan view of a first lens array of the exposure head of the embodiment.
FIG. 7B is an enlarged plan view of the first lens array.
FIG. 7C is a side view of the first lens array.
FIG. 7D is an enlarged side view of the first lens array.
FIG. 7E is a bottom view of the first lens array.
FIG. 7F is an enlarged bottom view of the first lens array.

The configuration of the first lens array 4 will now be described. FIG. 7A is a plan view of the first lens array 4. FIG. 7B is an enlarged plan view of the first lens array 4 illustrated in FIG. 7A, specifically, an end portion in the −X direction, a center portion in the X direction, and an end portion in the +X direction of the first lens array 4. FIG. 7C is a side view of the first lens array 4. FIG. 7D is an enlarged side view of the first lens array 4 illustrated in FIG. 7C, specifically, the end portion in the −X direction, the center portion in the X direction, and the end portion in the +X direction of the first lens array 4. FIG. 7E is a bottom view of the first lens array 4. FIG. 7F is an enlarged bottom view of the first lens array 4 illustrated in FIG. 7E, specifically, the end portion in the −X direction, the center portion in the X direction, and the end portion in the +X direction of the first lens array 4.

The first lens array 4 is composed of resin such as a cycloolefin polymer. Cycloolefin polymers have the advantage of low water absorption. Alternatively, the first lens array 4 may be composed of acrylic resin, polycarbonate, or epoxy resin.

As illustrated in FIGS. 7A and 7C, the first lens array 4 has an upper surface portion 4a, a lower surface portion 4b, two side surface portions 4c, and two end surface portions 4d. The upper surface portion 4a is located at the end in the +Z direction of the first lens array 4. The lower surface portion 4b is located at the end in the −Z direction of the first lens array 4. The two side surface portions 4c are located at both ends in the Y direction of the first lens array 4. The two end surface portions 4d are located at both ends in the X direction of the first lens array 4.

As illustrated in FIG. 7B, the first lens array 4 includes a plurality of lens elements 41 arranged in the X direction. The direction of optical axis (i.e., optical axis direction) of each lens element 41 is the Z direction. In this example, the lens elements 41 are arranged in two rows in a staggered manner. In each row, the lens elements 41 are arranged with a regular pitch (P) in the X direction. The lens elements 41 are formed in the center region in the X and Y directions of the first lens array 4.

Contact surfaces 48 are formed along both ends in the Y direction of the upper surface portion 4a. The contact surfaces 48 have a high flatness with a surface roughness of, for example, 10 μm or lower. The contact surfaces 48 are parallel to the XY plane and in contact with the reference surface 3b (FIG. 4) of the cover 3.

Grooves 42 are formed at both ends in the X direction of the upper surface portion 4a. The grooves 42 are U-shaped and elongated in the X direction. The grooves 42 engage with the pins 23 (FIG. 6D) of the holder 2.

As illustrated in FIGS. 7B and 7D, recesses 44 are formed at the center in the X direction of the upper surface portion 4a. In this example, two recesses 44 are formed on both ends in the Y direction of the upper surface portion 4a. The recesses 44 are grooves extending in the Y direction. The recesses 44 engage with the projections 24 (FIG. 6D) of the holder 2.

As illustrated in FIG. 7F, a contact surface 49 is formed on the lower surface portion 4b so as to surround the region in which the lens elements 41 are arranged (i.e., the center region). The contact surface 49 has a high flatness with a surface roughness of, for example, 10 μm or lower. The contact surface 49 is parallel to the XY plane and in contact with a contact surface 58 (described later) of the intermediate light shielding plate 5.

As illustrated in FIGS. 7D and 7F, pins 43 projecting in the −Z direction are formed at both ends in the X direction of the lower surface portion 4b. The pins 43 engage with grooves (described later) of the intermediate light shielding plate 5.

Projections 45 projecting in the −Z direction are formed at the center in the X direction of the lower surface portion 4b. In this example, two projections 45 are formed on both ends in the Y direction of the lower surface portion 4b. The projections 45 engage with recesses 54 (described later) of the intermediate light shielding plate 5.

A plurality of wall surface portions 46 are formed at regular intervals in the X direction on each side surface portion 4c. The wall surface portions 46 protrude outward in the Y direction. The wall surface portions 46 are parallel to the XZ plane and in contact with protrusions 56 (described later) of the intermediate light shielding plate 5.

As illustrated in FIG. 7D, a gate mark 401 is formed at the center in the X direction of the side surface portion 4c. The gate mart 401 is a mark of a gate in a mold, and is formed when the first lens array 4 is molded with resin. The gate mark 401 is generally scraped off through processing, and thus the gate mark 401 may be completely removed in some cases.

(Configuration of Intermediate Light Shielding Plate 5)

Figure 8:
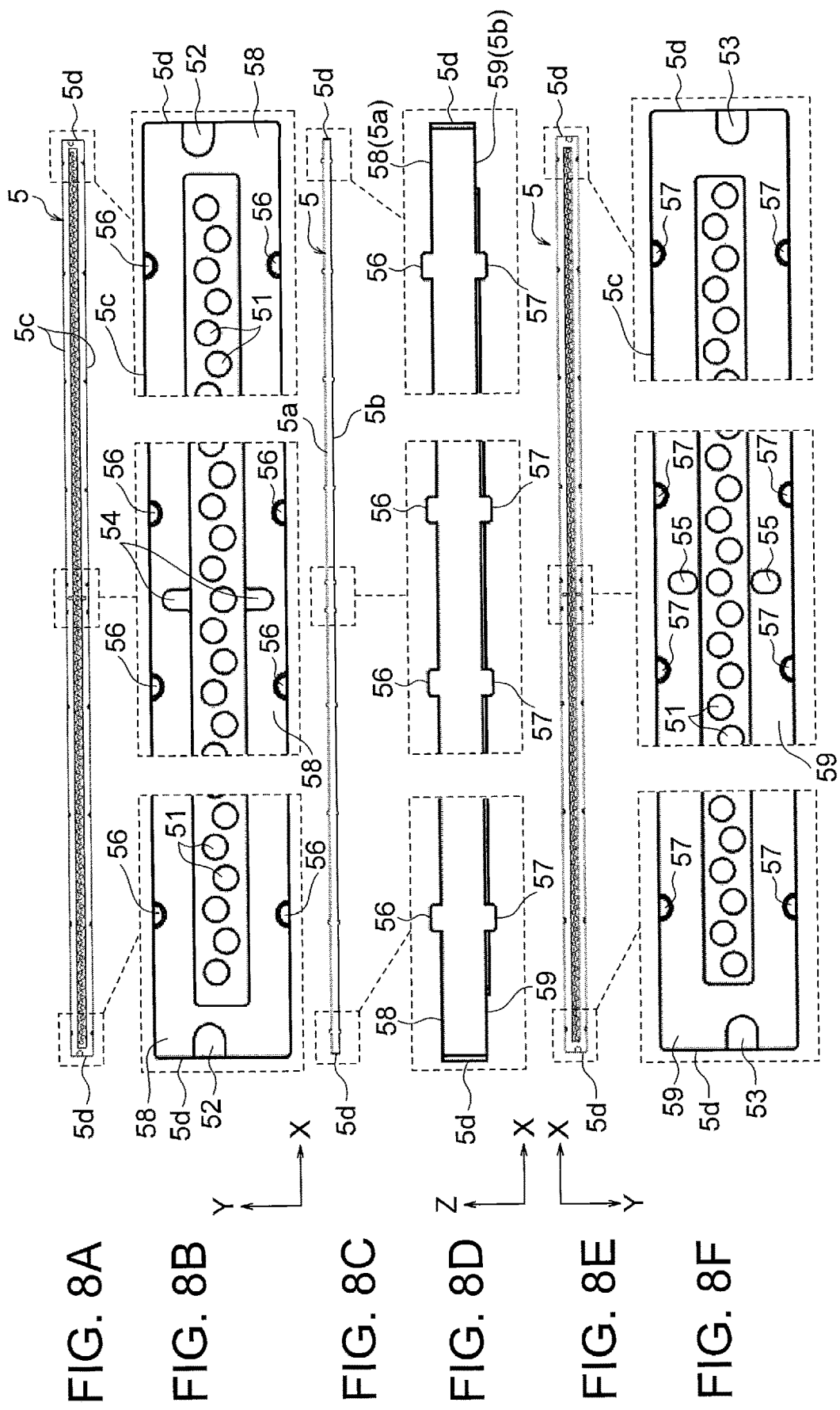
FIG. 8A is a plan view of an intermediate light shielding plate of the exposure head of the embodiment.
FIG. 8B is an enlarged plan view of the intermediate light shielding plate.
FIG. 8C is a side view of the intermediate light shielding plate.
FIG. 8D is an enlarged side view of the intermediate light shielding plate.
FIG. 8E is a bottom view of the intermediate light shielding plate.
FIG. 8F is an enlarged bottom view of the intermediate light shielding plate.

The configuration of the intermediate light shielding plate 5 will now be described. FIG. 8A is a plan view of the intermediate light shielding plate 5. FIG. 8B is an enlarged plan view of the intermediate light shielding plate 5 illustrated in FIG. 8A, specifically, an end portion in the −X direction, a center portion in the X direction, and an end portion in the +X direction of the intermediate light shielding plate 5. FIG. 8C is a side view of the intermediate light shielding plate 5. FIG. 8D is an enlarged side view of the intermediate light shielding plate 5 illustrated in FIG. 8C, specifically, the end portion in the −X direction, the center portion in the X direction, and the end portion in the +X direction of the intermediate light shielding plate 5. FIG. 8E is a bottom view of the intermediate light shielding plate 5.

FIG. 8F is an enlarged bottom view of the intermediate light shielding plate 5 illustrated in FIG. 8E, specifically, the end portion in the −X direction, the center portion in the X direction, and the end portion in the +X direction of the intermediate light shielding plate 5.

The intermediate light shielding plate 5 serves to maintain an optimal distance between the first lens array 4 and the second lens array 6 and to block stray light in the light rays entering the first lens array 4 from the second lens array 6. The intermediate light shielding plate 5 is composed of resin such as polycarbonate or acrylonitrile butadiene styrene (ABS).

As illustrated in FIGS. 8A and 8C, the intermediate light shielding plate 5 has an upper surface portion 5a, a lower surface portion 5b, two side surface portions 5c, and two end surface portions 5d. The upper surface portion 5a is located at the end in the +Z direction of the intermediate light shielding plate 5. The lower surface portion 5b is located at the end in the −Z direction of the intermediate light shielding plate 5. The two side surface portions 5c are located at both ends in the Y direction of the intermediate light shielding plate 5. The two end surface portions 5d are located at both ends in the X direction of the intermediate light shielding plate 5. The width of the intermediate light shielding plate 5 (i.e., the dimension in the Y direction) is wider than the width of the first lens array 4 and the width of the second lens array 6.

As illustrated in FIG. 8B, the intermediate light shielding plate 5 has a plurality of openings 51 arranged in the X direction. The positions of the openings 51 correspond to the positions of the lens elements 41 (FIG. 7B). The openings 51 each have a cylindrical shape having an axis in the Z direction. The openings 51 are formed at the center region in the X and Y directions of the intermediate light shielding plate 5.

A contact surface 58 is formed on the upper surface portion 5a so as to surround the region in which the openings 51 are arranged (i.e., the center region). The contact surface 58 has a high flatness with a surface roughness of, for example, 10 μm or lower. The contact surface 58 is parallel to the XY plane and in contact with the contact surface 49 (FIG. 7F) of the first lens array 4.

Grooves 52 are formed at both ends in the X direction of the upper surface portion 5a. The grooves 52 are U-shaped and elongated in the X direction. The grooves 52 engage with the pins 43 (FIG. 7F) of the first lens array 4.

Recesses 54 are formed at the center in the X direction of the upper surface portion 5a. In this example, two recesses 54 are formed on both sides in the Y direction of the region (i.e., the center region) in which the openings 51 are arranged. The recesses 54 are U-shaped and elongated in the Y direction. The recesses 54 engage with the projections 45 (FIG. 7F) of the first lens array 4.

As illustrated in FIGS. 8B and 8D, a plurality of protrusions 56 protruding in the +Z direction are arranged in the X direction on each of both ends in the Y direction of the upper surface portion 5a. In this example, the protrusions 56 have semi-cylindrical shapes with curved surfaces facing inward in the Y direction. The distance between two protrusions 56 facing each other in the Y direction is slightly wider than the width of the first lens array 4. The protrusions 56 serve as guides that come into contact with the wall surface portions 46 (FIG. 7F) of the first lens array 4 from the outer side in the Y direction.

As illustrated in FIG. 8F, a contact surface 59 is formed on the lower surface portion 5b so as to surround the region (i.e., the center region) in which the openings 51 are arranged. The contact surface 59 has a high flatness with a surface roughness of, for example, 10 μm or lower. The contact surface 59 is parallel to the XY plane and in contact with a contact surface 69 (described later) of the second lens array 6.

Grooves 53 are formed at both ends in the X direction of the lower surface portion 5b. The grooves 53 are U-shaped and elongated in the X direction. The grooves 53 engage with pins 63 (described later) of the second lens array 6.

Recesses 55 are formed at the center in the X direction of the lower surface portion 5b. In this example, two recesses 55 are formed on both sides in the Y direction of the region (i.e., the center region) in which the openings 51 are arranged. The recesses 55 are holes elongated in the Y direction. The recesses 55 engage with projections 65 (described later) of the second lens array 6.

As illustrated in FIGS. 8D and 8F, a plurality of protrusions 57 protruding in the −Z direction are arranged in the X direction on each of both ends in the Y direction of the lower surface portion 5b. In this example, the protrusions 57 have semi-cylindrical shapes with curved surfaces facing inward in the Y direction. The distance between two protrusions 57 facing each other in the Y direction is slightly wider than the width of the second lens array 6. The protrusions 57 serve as guides that come into contact with wall surface portions 66 (described later) of the second lens array 6 from the outer side in the Y direction.

(Configuration of Second Lens Array 6)

Figure 9:
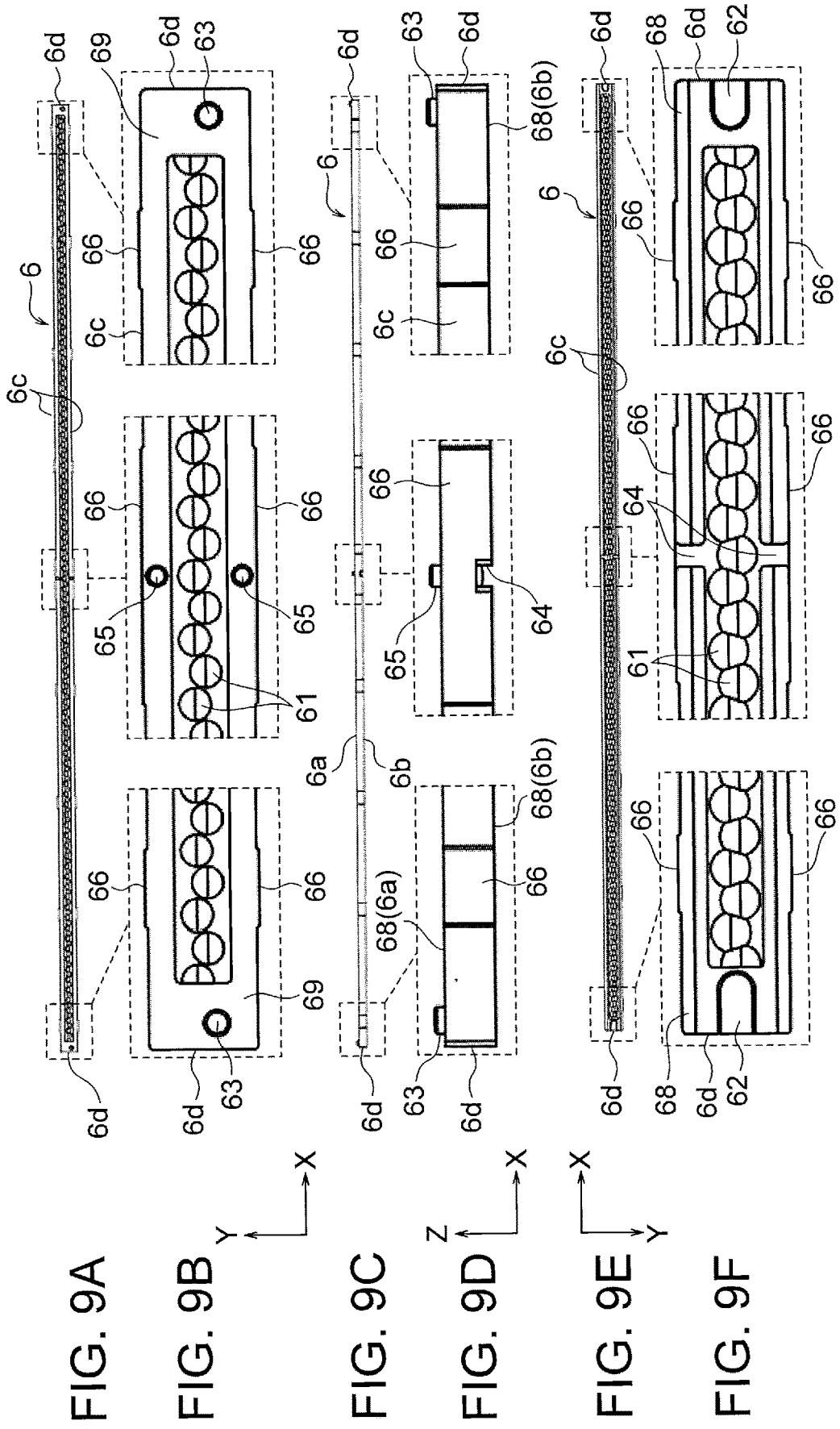
FIG. 9A is a plan view of a second lens array of the exposure head of the embodiment.
FIG. 9B is an enlarged plan view of the second lens array.
FIG. 9C is a side view of the second lens array.
FIG. 9D is an enlarged side view of the second lens array.
FIG. 9E is a bottom view of the second lens array.
FIG. 9F is an enlarged bottom view of the second lens array.

The configuration of the second lens array 6 will now be described. FIG. 9A is a plan view of the second lens array 6. FIG. 9B is an enlarged plan view of the second lens array 6 illustrated in FIG. 9A, specifically, an end portion in the −X direction, a center portion in the X direction, and an end portion in the +X direction of the second lens array 6. FIG. 9C is a side view of the second lens array 6. FIG. 9D is an enlarged side view of the second lens array 6 illustrated in FIG. 9C, specifically, the end portion in the −X direction, the center portion in the X direction, and the end portion in the +X direction of the second lens array 6. FIG. 9E is a bottom view of the second lens array 6. FIG. 9F is an enlarged bottom view of the second lens array 6 illustrated in FIG. 9E, specifically, the end portion in the −X direction, the center portion in the X direction, and the end portion in the +X direction of the second lens array 6.

The second lens array 6 is composed of resin such as a cycloolefin polymer. Alternatively, the second lens array 6 may be composed of acrylic resin, polycarbonate, or epoxy resin.

As illustrated in FIGS. 9A and 9C, the second lens array 6 has an upper surface portion 6a, a lower surface portion 6b, two side surface portions 6c, and two end surface portions 6d. The upper surface portion 6a is located at the end in the +Z direction of the second lens array 6. The lower surface portion 6b is located at the end in the −Z direction of the second lens array 6. The two side surface portions 6c are located at both ends in the Y direction of the second lens array 6. The two end surface portions 6d are located at both ends in the X direction of the second lens array 6.

As illustrated in FIG. 9B, the second lens array 6 includes a plurality of lens elements (microlenses) 61 arranged in the X direction. The direction of the optical axis of each lens element 61 is the Z direction. The lens elements 61 are formed at the center in the X and Y directions of the second lens array 6.

The first lens array 4 (FIG. 7) and the second lens array 6 have the same shape, and the second lens array 6 is in a positional relationship with the first lens array 4 such that the second lens array 6 is rotated by 180 degrees about a rotation axis in the X direction and shifted in the X direction by half a pitch (P/2) relative to the first lens array 4. Therefore, the optical axes of the corresponding lens elements 41 and 61 facing each other in the Z direction are coincident with each other. The first lens array 4 and the second lens array 6 serve to form erect, unmagnified images of light emitting elements 81 (described later) of the substrate 8.

A contact surface 69 is formed on the upper surface portion 6a so as to surround the region (i.e., the center region) in which the lens elements 61 are arranged. The contact surface 69 has a high flatness with a surface roughness of, for example, 10 μm or lower. The contact surface 69 is parallel to the XY plane and in contact with the contact surface 59 (FIG. 8F) of the intermediate light shielding plate 5.

Pins 63 projecting in the +Z direction are formed at both ends in the X direction of the upper surface portion 6a. The pins 63 engage with the grooves 53 (FIG. 8F) of the intermediate light shielding plate 5.

As illustrated in FIGS. 9B and 9D, projections 65 projecting in the +Z direction are formed at the center in the X direction of the upper surface portion 6a. In this example, two projections 65 are formed on both sides in the Y direction of the region (i.e., the center region) in which the lens elements 61 are arranged. The projections 65 engage with the recesses 55 (FIG. 8F) of the intermediate light shielding plate 5.

As illustrated in FIG. 9F, contact surfaces 68 are formed along both ends in the Y direction of the lower surface portion 6b. The contact surfaces 68 have a high flatness with a surface roughness of, for example, 10 μm or lower. The contact surfaces 68 are parallel to the XY plane and in contact with a contact surface 78 (described later) of the incident light shielding plate 7.

Grooves 62 are formed at both ends in the X direction of the lower surface portion 6b. The grooves 62 are U-shaped and elongated in the X direction. The grooves 62 engage with pins 72 (described later) of the incident light shielding plate 7.

Recesses 64 are formed at the center in the X direction of the lower surface portion 6b. In this example, two recesses 64 are formed on both ends in the Y direction of the lower surface portion 6b. The recesses 64 are grooves extending in the Y direction. The recesses 64 engage with projections 74 (described later) of the incident light shielding plate 7.

A plurality of wall surface portions 66 are formed at regular intervals in the X direction on each side surface portion 6c. The wall surface portions 66 protrude outward in the Y direction. The wall surface portions 66 are parallel to the XZ plane and in contact with the protrusions 57 (FIG. 8F) of the intermediate light shielding plate 5 and protrusions 76 (described later) of the incident light shielding plate 7.

Although not illustrated, a gate mart which is similar to the gate mark 401 (FIG. 7D) of the first lens array 4 may be formed at the center in the X direction of the side surface portion 6c.

(Configuration of Incident Light Shielding Plate 7)

Figure 10:
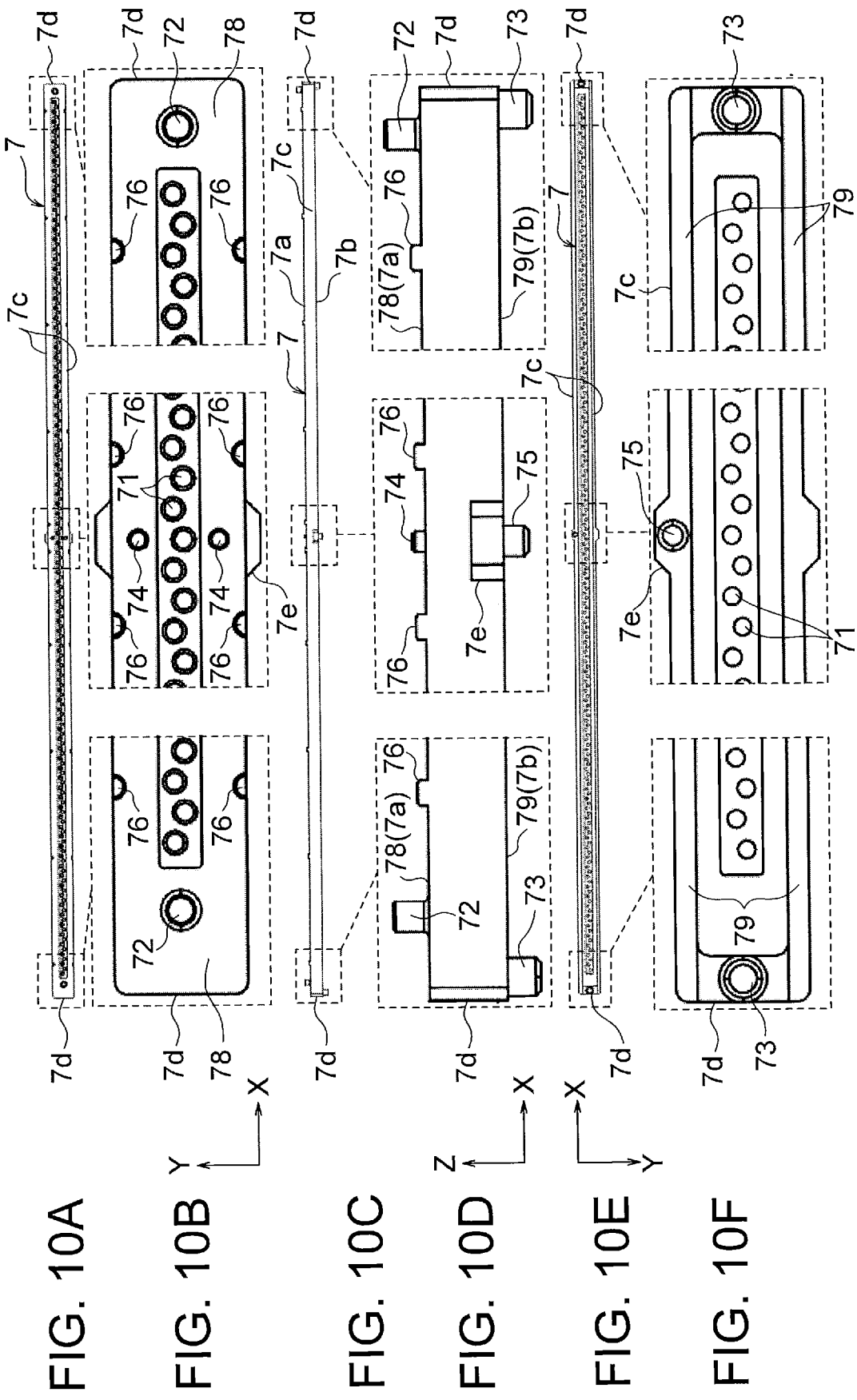
FIG. 10A is a plan view of an incident light shielding plate of the exposure head of the embodiment.
FIG. 10B is an enlarged plan view of the incident light shielding plate.
FIG. 10C is a side view of the incident light shielding plate.
FIG. 10D is an enlarged side view of the incident light shielding plate.
FIG. 10E is a bottom view of the incident light shielding plate.
FIG. 10F is an enlarged bottom view of the incident light shielding plate.

The configuration of the incident light shielding plate 7 will now be described. FIG. 10A is a plan view of the incident light shielding plate 7. FIG. 10B is an enlarged plan view of the incident light shielding plate 7 illustrated in FIG. 10A, specifically, an end in the −X direction, a center in the X direction, and an end in the +X direction of the incident light shielding plate 7. FIG. 10C is a side view of the incident light shielding plate 7. FIG. 10D is an enlarged side view of the incident light shielding plate 7 illustrated in FIG. 10C, specifically, the end in the −X direction, the center in the X direction, and the end in the +X direction of the incident light shielding plate 7. FIG. 10E is a bottom view of the incident light shielding plate 7. FIG. 10F is an enlarged bottom view of the incident light shielding plate 7 illustrated in FIG. 10E, specifically, the end in the −X direction, the center in the X direction, and the end in the +X direction of the incident light shielding plate 7.

The incident light shielding plate 7 serves to maintain an optimal distance between the second lens array 6 and the substrate 8 and block stray light in light rays entering the second lens array 6 from the substrate 8. The incident light shielding plate 7 is composed of resin such as polycarbonate or acrylonitrile butadiene styrene (ABS).

The incident light shielding plate 7 has a plurality of openings 71 arranged in the X direction. The positions of the openings 71 correspond to the positions of the lens elements 61 (FIG. 9B). Each opening 71 has a shape of a circular truncated cone having an axis in the Z direction and having an inner diameter increasing in the +Z direction. The openings 71 are formed at the center in the X and Y directions of the incident light shielding plate 7.

As illustrated in FIGS. 10A and 10C, the incident light shielding plate 7 has an upper surface portion 7a, a lower surface portion 7b, two side surface portions 7c, and two end surface portions 7d. The upper surface portion 7a is located at the end in the +Z direction of the incident light shielding plate 7. The lower surface portion 7b is located at the end in the −Z direction of the incident light shielding plate 7. The two side surface portions 7c are located at both ends in the Y direction of the incident light shielding plate 7. The two end surface portions 7d are located at both ends in the X direction of the incident light shielding plate 7. The width of the incident light shielding plate 7 (i.e., the dimension in the Y direction) is wider than the width of the first lens array 4 and the width of the second lens array 6.

As illustrated in FIG. 10B, a contact surface 78 is formed on the upper surface portion 7a so as to surround the region (i.e., the center region) in which the openings 71 are arranged. The contact surface 78 has a high flatness with a surface roughness of, for example, 10 µm or lower. The contact surface 78 is parallel to the XY plane and in contact with the contact surfaces 68 (FIG. 9F) of the second lens array 6.

As illustrated in FIGS. 10B and 10D, pins 72 are formed at both ends in the X direction of the upper surface portion 7a. The pins 72 engage with the recesses 62 (FIG. 9F) of the second lens array 6.

Projections 74 are formed at the center in the X direction of the upper surface portion 7a. In this example, two projections 74 are formed on both sides in the Y direction of the region (i.e., the center region) in which the openings 71 are arranged. The projections 74 engage with the recesses 64 (FIG. 9F) of the second lens array 6.

A plurality of protrusions 76 projecting in the +Z direction are arranged in the X direction on each of both ends in the Y direction of the upper surface portion 7a. In this example, the protrusions 76 have semi-cylindrical shapes with curved surfaces facing inward in the Y direction. The distance between the two protrusions 76 facing each other in the Y direction is slightly wider than the width of the second lens array 6. The protrusions 76 serve as guides that come in contact with the wall surface portions 66 (FIG. 9F) of the second lens array 6 from the outer side in the Y direction.

As illustrated in FIGS. 10D and 10F, contact surfaces 79 are formed along both ends in the Y direction of the lower surface portion 7b. The contact surfaces 79 have a high flatness with a surface roughness of, for example, 10 µm or lower. The contact surfaces 79 are parallel to the XY plane and in contact with the surface 8a (described later) of the substrate 8.

Pins 73 projecting in the −Z direction are formed at both ends in the X direction of the lower surface portion 7b. The pins 73 engage with grooves 82 (described later) of the substrate 8.

A protrusion 7e protruding outward in the Y direction is formed at the center in the X direction of the lower surface portion 7b. A projection 75 projecting in the −Z direction is formed on the protrusion 7e. In this example, one projection 75 is formed on one end in the Y direction (an end in the −Y direction in this example) of the lower surface portion 7b. The projection 75 engages with a groove 85 (described below) of the substrate 8.

(Configuration of Substrate 8)

Figure 11:
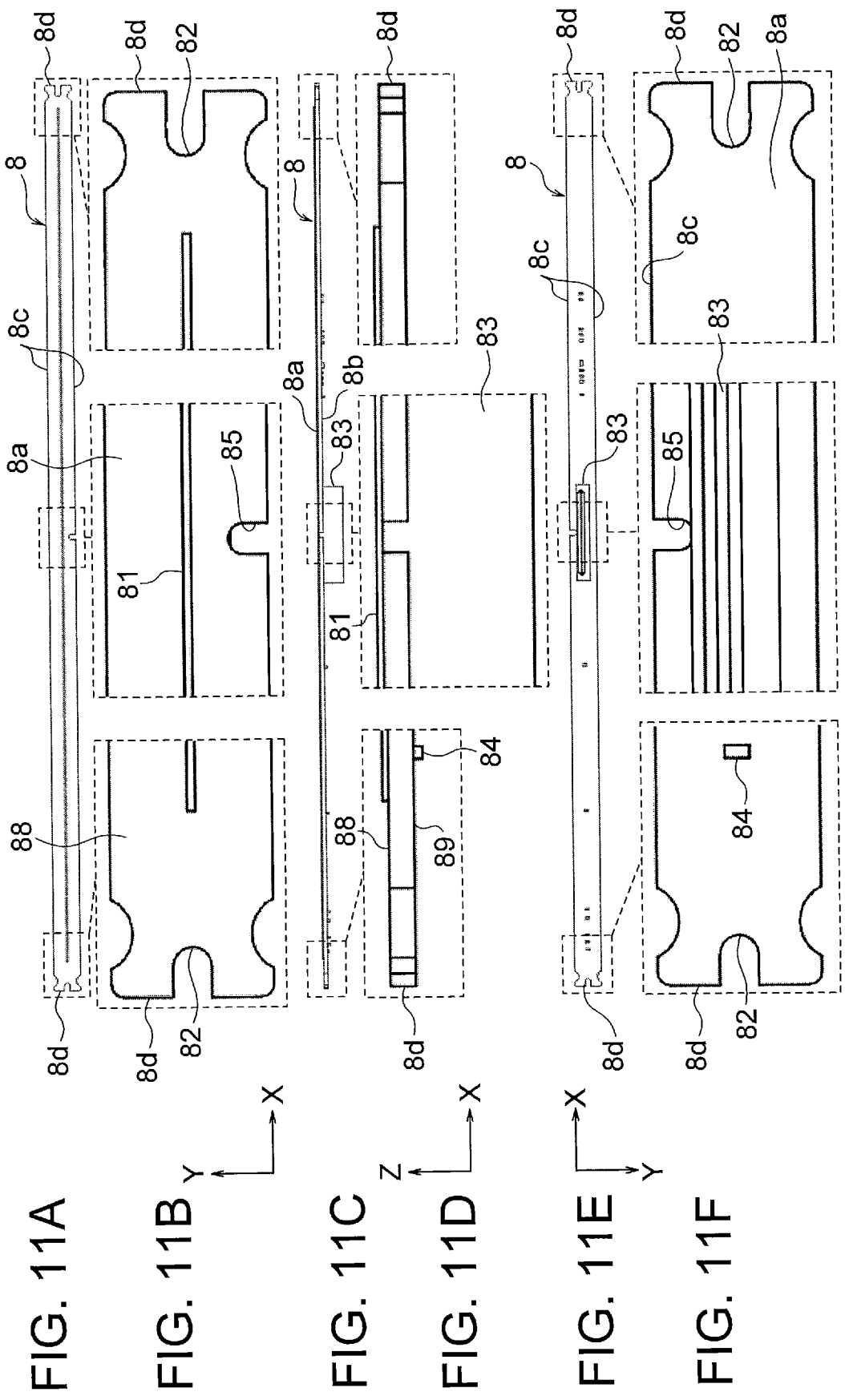
FIG. 11A is a plan view of a substrate of the exposure head of the embodiment.
FIG. 11B is an enlarged plan view of the substrate.
FIG. 11C is a side view of the substrate.
FIG. 11D is an enlarged side view of the substrate.
FIG. 11E is a bottom view of the substrate.
FIG. 11F is an enlarged bottom view of the substrate.

The configuration of the substrate 8 will now be described. FIG. 11A is a plan view of the substrate 8. FIG. 11B is an enlarged plan view of the substrate 8 illustrated in FIG. 11A, specifically, an end portion in the −X direction, a center portion in the X direction, and an end portion in the +X direction of the substrate 8. FIG. 11C is a side view of the substrate 8. FIG. 11D is an enlarged side view of the substrate 8 illustrated in FIG. 11C, specifically, the end portion in the −X direction, the center portion in the X direction, and the end portion in the +X direction of the substrate 8. FIG. 11E is a bottom view of the substrate 8. FIG. 11F is an enlarged bottom view of the substrate 8 illustrated in FIG. 11E, specifically, the end portion in the −X direction, the center portion in the X direction, and the end portion in the +X direction of the substrate 8.

The substrate 8 is, for example, a flame retardant type 4 (FR4), that is, a wiring substrate (printed circuit board) formed of a glass epoxy substrate.

As illustrated in FIGS. 11A and 11C, the substrate 8 has a surface 8a, a back surface 8b, two side surfaces 8c, and two end surfaces 8d. The surface 8a faces in the +Z direction. The back surface 8b faces in the −Z direction. The two side surfaces 8c are located at both ends in the Y direction of the substrate 8. The two end surfaces 8d are located at both ends in the X direction of the substrate 8. The width of the substrate 8 (i.e., the dimension in the Y direction) is wider than the width of the intermediate light shielding plate 5 and the width of the incident light shielding plate 7.

As illustrated in FIG. 11B, the light emitting elements 81 constituted by light emitting diodes (LEDs) are arranged in the X direction on the surface 8a of the substrate 8. The light emitting elements 81 are arranged in the X direction with a pitch corresponding to, for example, 600 or 1200 dpi. A drive circuit may be formed integrally with the light emitting elements 81.

As illustrated in FIGS. 11E and 11F, a connector 83 and an electronic component 84 are mounted on the back surface 8b of the substrate 8. The connector 83 connects the substrate 8 to the main body of the image forming apparatus 1. The electronic component 84 is used for the driving of the light emitting elements 81.

Grooves 82 are formed at both ends in the X direction of the substrate 8. The grooves 82 are U-shaped and elongated in the X direction. The grooves 82 engage with the pins 73 (FIG. 10F) of the incident light shielding plate 7.

A groove 85 is formed at the center in the X direction of the substrate 8. In this example, one groove 85 is formed on one end in the Y direction (an end in the −Y direction in this example) of the substrate 8. The groove 85 is U-shaped and elongated in the Y direction. The groove 85 engages with the projection 75 (FIG. 10F) of the incident light shielding plate 7.

(Configuration of Insulating Film 9)

The insulating film 9 will now be described. The insulating film 9 illustrated in FIG. 4 is a film having electrical insulation properties. In this example, the insulating film 9 has a rectangular shape and has an area that is smaller than the inside area of the holder 2. The insulating film 9 is fixed to the open end 2b of the holder 2 with the adhesive agent 13 supplied through the holes 22 of the holder 2.

The insulating film 9 serves to protect the substrate 8 from external electrostatic discharge. The insulating film 9 is composed of, for example, polyethylene terephthalate (PET). In place of the insulating film, an insulating sheet or plate may be used.

(Configuration of Adhesive Agents 11, 13, and 15)

The adhesive agents 11, 13, and 15 will now be described. As illustrated in FIG. 4, the cover 3 is fixed to the holder 2 with the adhesive agent 11. The insulating film 9 is fixed to the holder 2 with the adhesive agent 13. As will be described later, the lens unit L is fixed to the holder 2 with the adhesive agent 15 (FIG. 2). The adhesive agents 11, 13, and 15 are composed of, for example, ultraviolet (UV) curable resin mainly composed of acrylic resin.

(Configuration of Sealing Resins 12 and 14)

The sealing resins 12 and 14 will now be described. As illustrated in FIG. 4, the sealing resin 12 is disposed between the cover 3 and the holder 2. The sealing resin 14 is disposed between the insulating film 9 and the holder 2. The sealing resins 12 and 14 are composed of, for example, silicone resin. The sealing resins 12 and 14 serve to prevent dust from entering the exposure head 10 and protect the inside of the exposure head 10 from electrostatic discharge.

(Positioning of Components)

Figure 12:
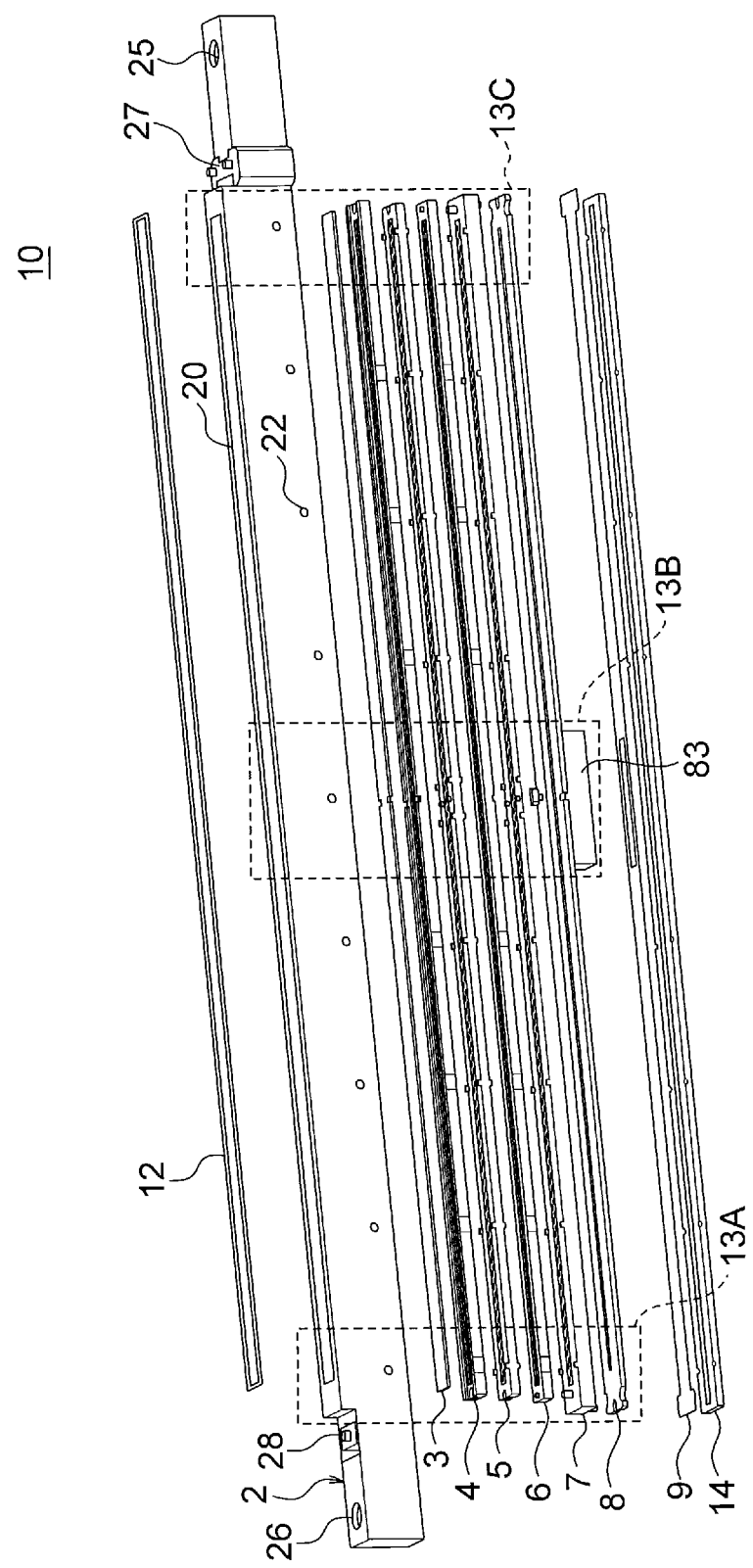
FIG. 12 is an exploded perspective view of the components of the exposure head of the embodiment.
Figure 13A:
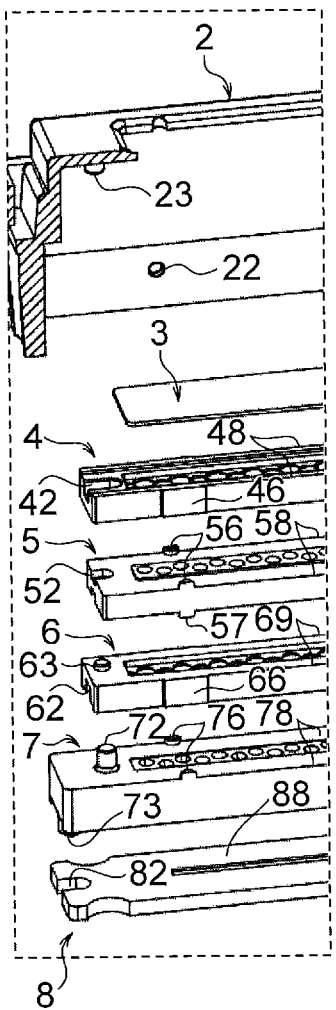
FIGS. 13A to 13C are enlarged views of the components of the exposure head of the embodiment.
Figure 13B:
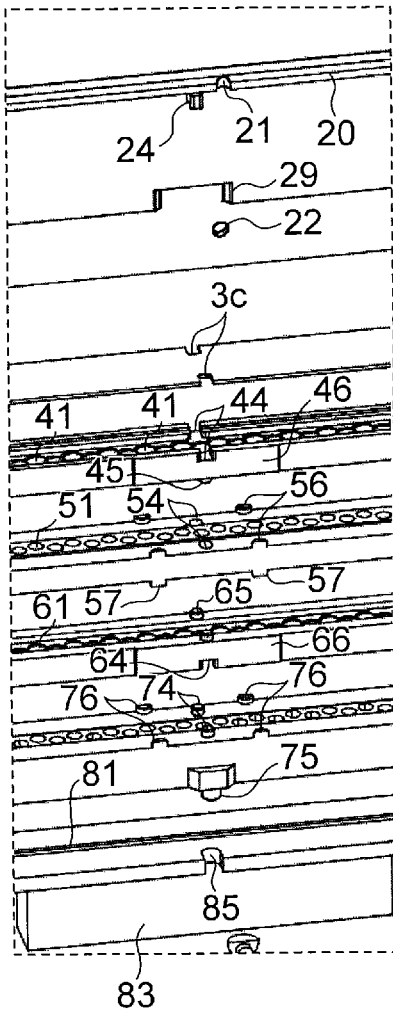
Figure 13C:
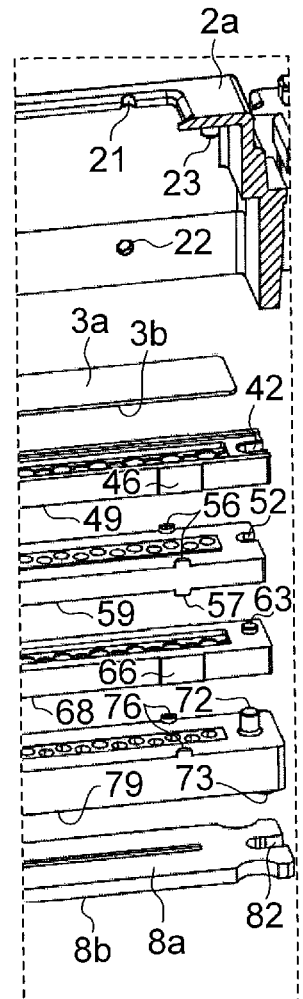

FIG. 12 is an exploded perspective view of the holder 2, the cover 3, the lens unit L (the first lens array 4, the intermediate light shielding plate 5, the second lens array 6, and the incident light shielding plate 7), the substrate 8, the insulating film 9, and the sealing resins 12 and 14. FIGS. 13A, 13B, and 13C are enlarged views respectively illustrating an end portion in the −X direction, a center portion in the X direction, and an end portion in the +X direction of the holder 2 and the stacked body illustrated in FIG. 12.

The positioning of the components of the stacked body in the Y direction will now be described with reference to FIGS. 13A to 13C. First, the pins 23 of the holder 2 engage with the grooves 42 of the first lens array 4 to position the first lens array 4 in the Y direction. The pins 43 (FIG. 7D) of the first lens array 4 engage with the grooves 52 of the intermediate light shielding plate 5 to position the intermediate light shielding plate 5 in the Y direction.

The grooves 53 (FIG. 8F) of the intermediate light shielding plate 5 engage with the pins 63 of the second lens array 6 to position the second lens array 6 in the Y direction. The grooves 62 (FIG. 9F) of the second lens array 6 engage with the pins 72 of the incident light shielding plate 7 to position the incident light shielding plate 7 in the Y direction. The pins 73 of the incident light shielding plate 7 engage with the grooves 82 of the substrate 8 to position the substrate 8 in the Y direction.

In addition, warpage of the first lens array 4 in the Y direction is suppressed by the wall surface portions 46 of the first lens array 4 that come into contact with the protrusions 56 of the intermediate light shielding plate 5. Warpage of the second lens array 6 in the Y direction is suppressed by the wall surface portions 66 of the second lens array 6 that come into contact with the protrusions 57 of the intermediate light shielding plate 5 and the protrusions 76 of the incident light shielding plate 7.

That is, the positions in the Y direction of the first lens array 4, the intermediate light shielding plate 5, the second lens array 6, the incident light shielding plate 7, and the substrate 8 are restricted with respect to the pins 23 of the holder 2. In other words, the lens unit L is positioned in the Y direction at its both ends in the X direction by the pins 23 of the holder 2.

These engaging portions engage with each other with high precision so that their maximum tolerance in the Y direction is approximately 10 μm, but sufficient play is provided in the X direction (for example, 0.5 mm).

The positioning of the components of the stacked body in the X direction will now be described with reference to FIGS. 13A to 13C. The projections 24 of the holder 2 engage with the recesses 44 of the first lens array 4 to restrict the center position in the X direction of the first lens array 4. The projections 45 of the first lens array 4 engage with the recesses 54 of the intermediate light shielding plate 5 to restrict the center position in the X direction of the intermediate light shielding plate 5.

The recesses 55 (FIG. 8F) of the intermediate light shielding plate 5 engage with the projections 65 of the second lens array 6 to restrict the center position in the X direction of the second lens array 6. The recesses 64 of the second lens array 6 engage with the projections 74 of the incident light shielding plate 7 to restrict the center position in the X direction of the incident light shielding plate 7. The projection 75 of the incident light shielding plate 7 engages with the groove 85 of the substrate 8 to restrict the center position in the X direction of the substrate 8.

That is, the center positions in the X direction of the first lens array 4, the intermediate light shielding plate 5, the second lens array 6, the incident light shielding plate 7, and the substrate 8 are restricted with respect to the projections 24 of the holder 2. In other words, the lens unit L is positioned in the X direction at its center in the X direction by the projections 24 of the holder 2.

These engaging portions engage with each other with high precision so that their maximum tolerance in the X direction is approximately 10 μm, but sufficient play is provided in the Y direction.

The positioning of the components of the stacked body in the Z direction will now be described with reference to FIGS. 13A to 13C. The cover 3 is fixed to the holder 2 with a high flatness using a jig 300 (FIG. 15) described later. The contact surfaces 48 of the first lens array 4 come into contact with the reference surface 3b of the cover 3 to position the first lens array 4 in the Z direction. The contact surface 58 of the intermediate light shielding plate 5 comes into contact with the contact surface 49 of the first lens array 4 to position the intermediate light shielding plate 5 in the Z direction.

The contact surface 69 of the second lens array 6 comes into contact with the contact surface 59 of the intermediate light shielding plate 5 to position the second lens array 6 in the Z direction. The contact surface 78 of the incident light shielding plate 7 comes into contact with the contact surfaces 68 of the second lens array 6 to position the incident light shielding plate 7 in the Z direction. The surface 8a of the substrate 8 comes into contact with the contact surfaces 79 of the incident light shielding plate 7 to restrict the position of the substrate 8 in the Z direction.

When the top cover 1B of the image forming apparatus 1 is closed, the hole 25 and the elongated hole 26 (FIG. 3A)

of the holder 2 engage with the protrusions provided on the casing of the process unit 30 to position the exposure head 10 in the XY plane.

Coil springs disposed on the top cover 1B engage the engaging portions 29 (FIG. 3B) of the holder 2 to bias the exposure head 10 in the +Z direction. The contact portions 27 and 28 (FIG. 3A) of the holder 2 come into contact with the contact portions of the casing of the process unit 30 in the Z direction to position the exposure head 10 in the Z direction.

In this state, the distance from the light emitting elements 81 of the substrate 8 to the lens elements 61 of the second lens array 6 is equal to the distance from the lens elements 41 of the first lens array 4 to the surface of the photosensitive drum 31. The light emitted from each light emitting element 81 passes through the opening 71 of the incident light shielding plate 7, the lens element 61 of the second lens array 6, the opening 51 of the intermediate light shielding plate 5, the lens element 41 of the first lens array 4, and the cover 3, and is focused on the surface of the photosensitive drum 31.

(Method of Producing Exposure Head 10)

Figure 14:
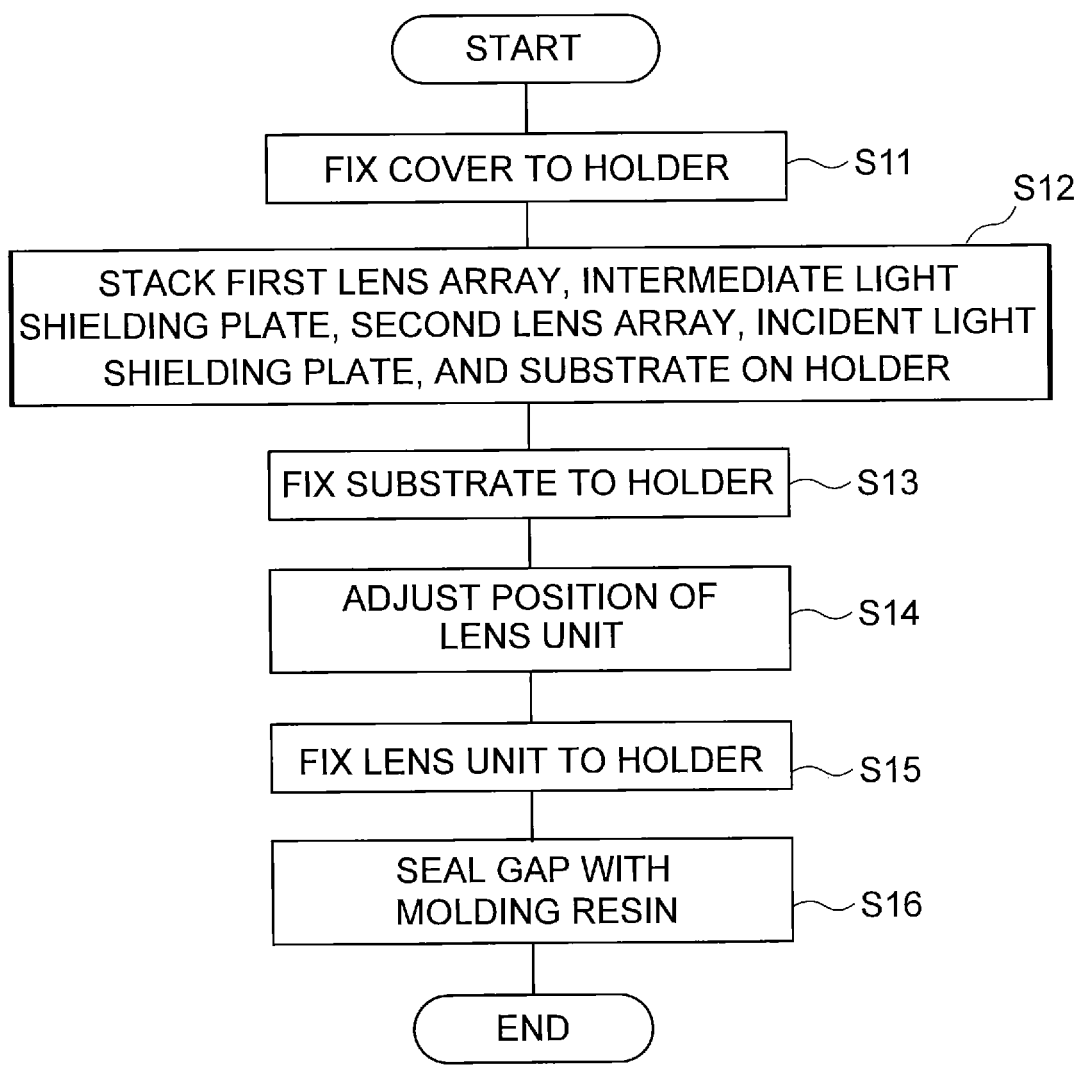
FIG. 14 is a flowchart illustrating a production process of the exposure head of the embodiment.

A method of producing the exposure head 10 will now be described. FIG. 14 is a flowchart illustrating a production process of the exposure head 10. In assembling the exposure head 10, first, the cover 3 is positioned and fixed to the holder 2 (step S11).

Figure 15:
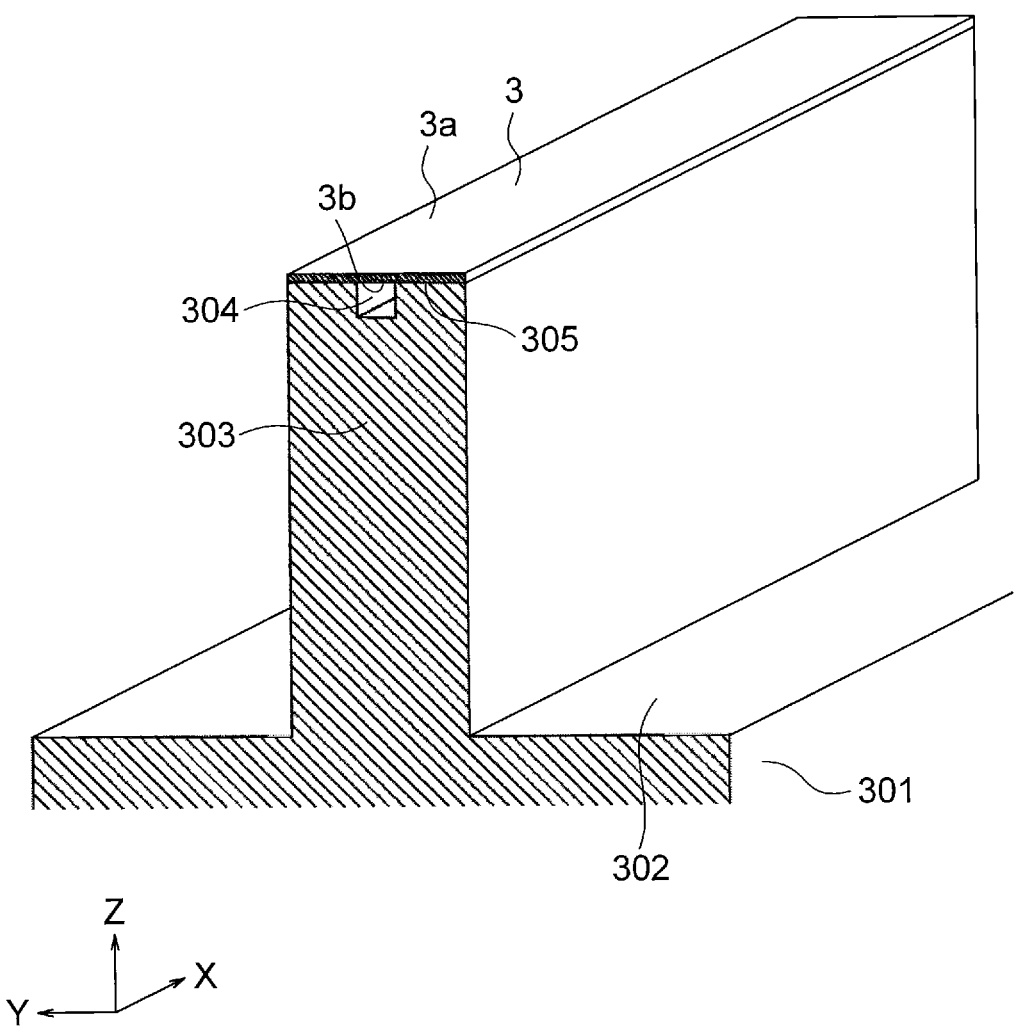
FIG. 15 is a partially sectional perspective view illustrating a state in which a cover is held using a jig.
Figure 16:
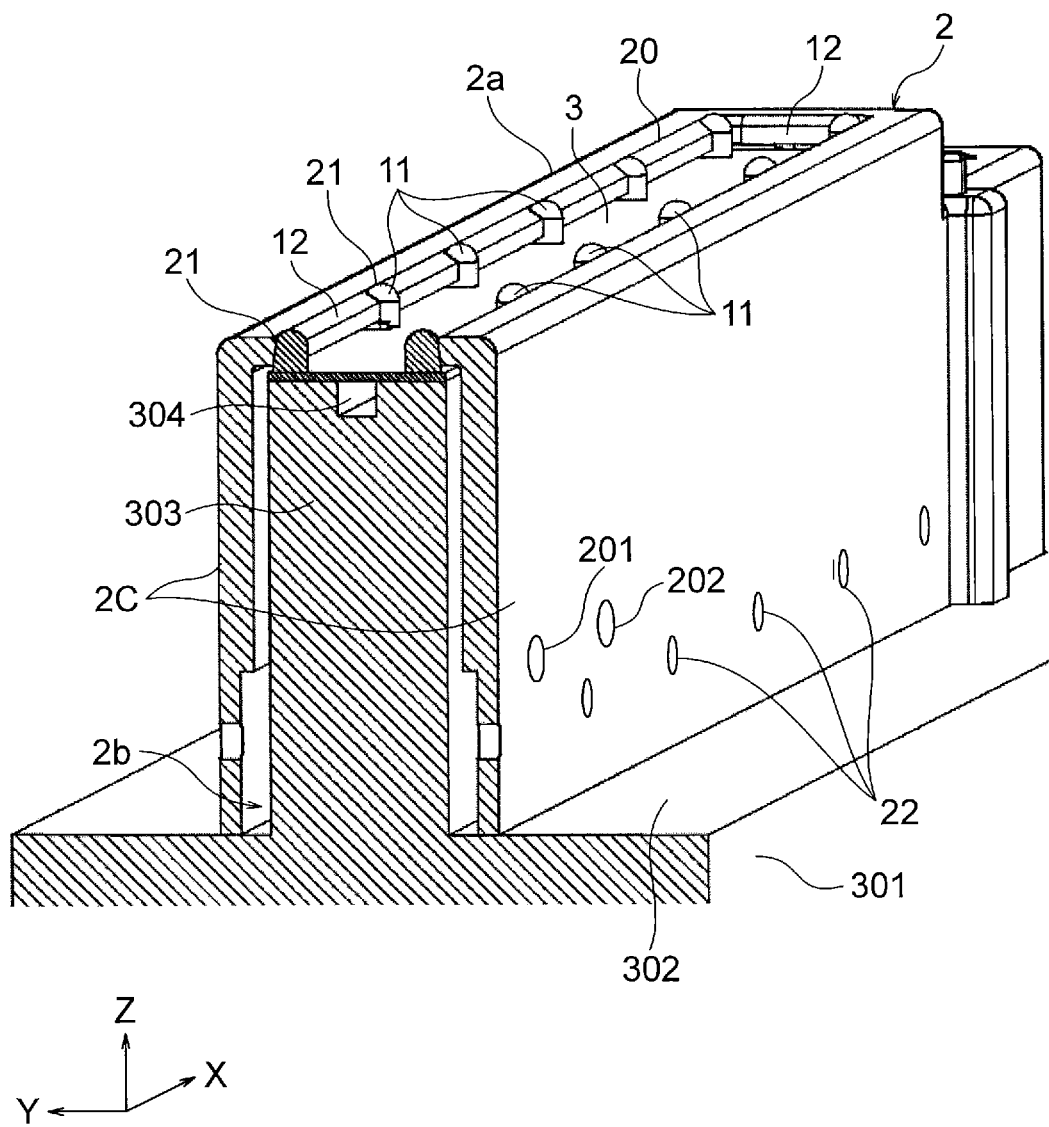
FIG. 16 is a partially sectional perspective view illustrating a step of fixing the cover to the holder.

FIGS. 15 and 16 schematically illustrate a method of positioning and fixing the cover 3 to the holder 2. The jig used in this example has a support table 301 and a projecting portion 303. The projecting portion 303 is disposed on the support table 301 and has a reference surface 305. The reference surface 305 has a high flatness with a surface roughness of 10 μm or lower. It is preferred that the area of the reference surface 305 is substantially the same as the area of the cover 3.

A suction groove 304 is formed on the reference surface 305 of the projecting portion 303. The suction groove 304 is connected to a pump (suction device) through a path (not illustrated). The suction groove 304 extends throughout substantially the entire length of the reference surface 305 in the longitudinal direction.

The cover 3 is placed on the reference surface 305 of the jig 300 with the reference surface 3b facing downward, as illustrated in FIG. 15. In this state, suction is performed by the pump to lower the atmospheric pressure in the suction groove 304 so that the cover 3 is sucked against the reference surface 305.

Subsequently, the holder 2 is attached to the jig 300 so as to cover the projecting portion 303 while the open end 2b faces downward, as illustrated in FIG. 16. The height of the projecting portion 303 is set so that a slight gap is formed between the cover 3 on the reference surface 305 and the top plate portion 2a of the holder 2 when the lower edges of the sidewalls 2c of the holder 2 are in contact with the upper surface 302 of the support table 301.

In this state, the adhesive agent 11 is supplied to the cutout portions 21 of the top plate portion 2a of the holder 2. The adhesive agent 11 is then irradiated with ultraviolet rays and cured to fix the cover 3 to the holder 2. After the cover 3 is fixed to the holder 2, the suction by the pump is stopped, and the holder 2 and the cover 3 are removed from the jig 300. As a result, the cover 3 is fixed to the holder 2 with a high flatness similar to that of the reference surface 305 of the jig 300.

Figure 17:
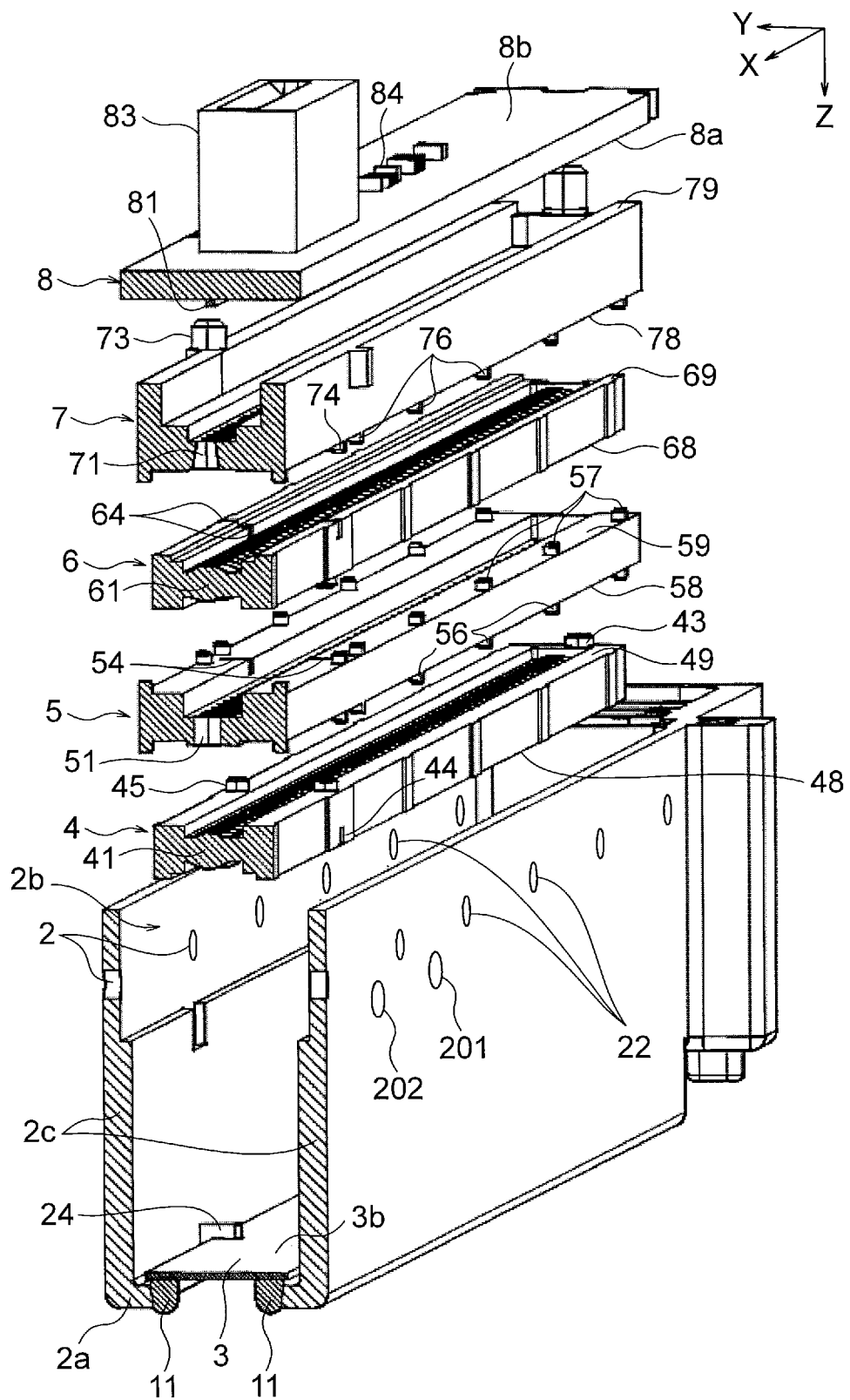
FIG. 17 is a partially sectional perspective view illustrating a step of housing the lens unit and the substrate in the holder of the exposure head of the embodiment.
Figure 18:
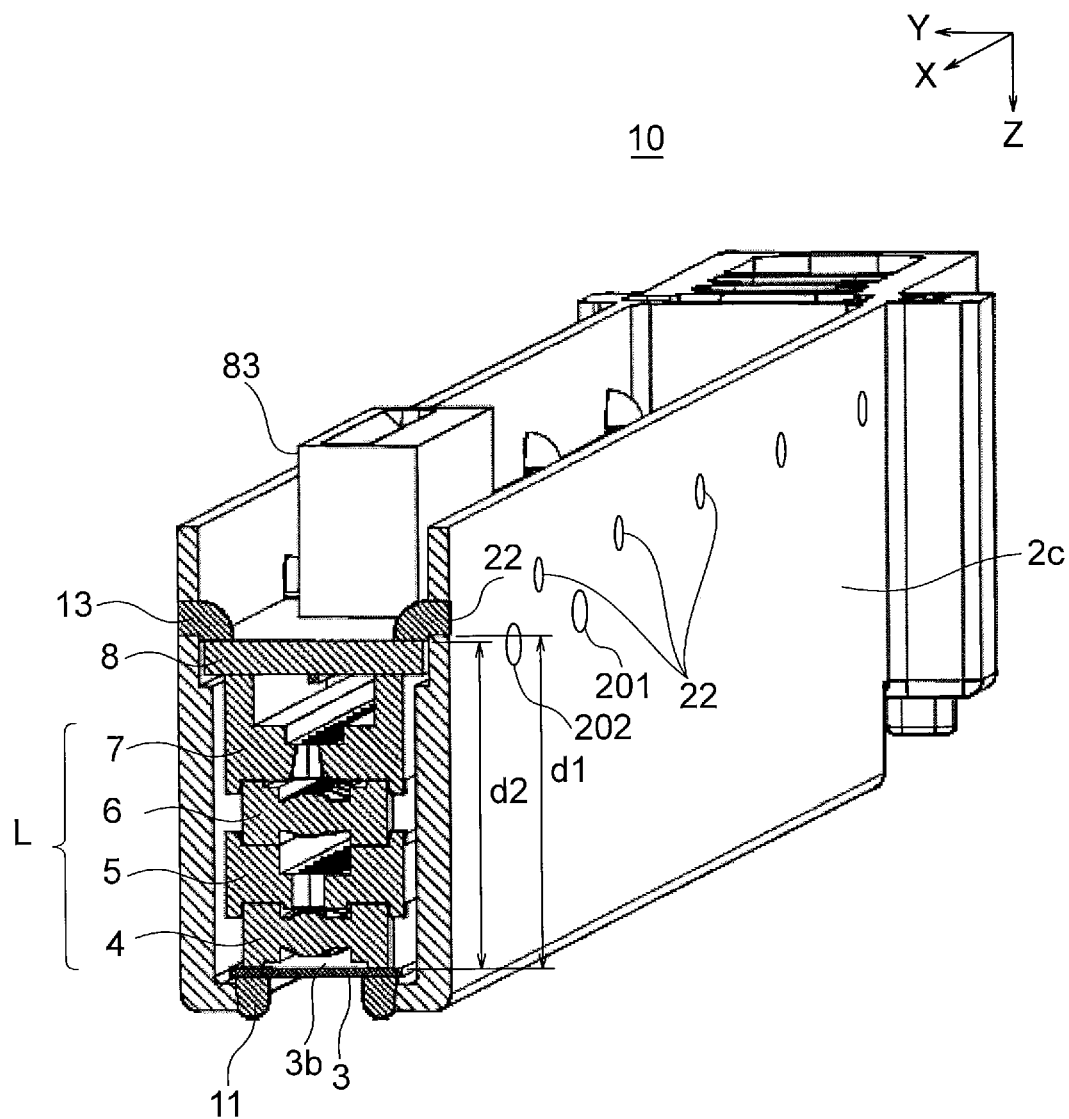
FIG. 18 is a partially sectional perspective view illustrating a step of housing the lens unit and the substrate in the holder of the exposure head, and fixing the substrate to the holder of the embodiment.

FIGS. 17 and 18 are partially sectional perspective views illustrating steps of fixing the components to the holder 2.

After the cover 3 is fixed to the holder 2, the holder 2 is inverted so that the top plate portion 2a faces downward and the open end 2b faces upward, as illustrated in FIG. 17. Then, the first lens array 4, the intermediate light shielding plate 5, the second lens array 6, the incident light shielding plate 7, and the substrate 8 are stacked in this order on the reference surface 3b of the cover 3 (step S12).

In this state, the first lens array 4, the intermediate light shielding plate 5, the second lens array 6, the incident light shielding plate 7, and the substrate 8 are stacked in the Z direction on the top plate portion 2a (supporting portion) of the holder 2 via the cover 3.

The first lens array 4, the intermediate light shielding plate 5, the second lens array 6, the incident light shielding plate 7, and the substrate 8 are positioned in the X and Y directions with respect to the holder 2, as described above. Further, the substrate 8 is pressed toward the cover 3 during stacking, and thus the first lens array 4, the intermediate light shielding plate 5, the second lens array 6, the incident light shielding plate 7, and the substrate 8 are positioned in the Z direction with respect to the holder 2.

Subsequently, the adhesive agent 13 is supplied to the holes 22 of the holder 2 and cured by UV irradiation to fix the substrate 8 to the holder 2 (step S13), as illustrated in FIG. 18. As a result, the lens unit L (the first lens array 4, the intermediate light shielding plate 5, the second lens array 6, and the incident light shielding plate 7) is held between the cover 3 and the substrate 8 in the Z direction.

Figure 19:
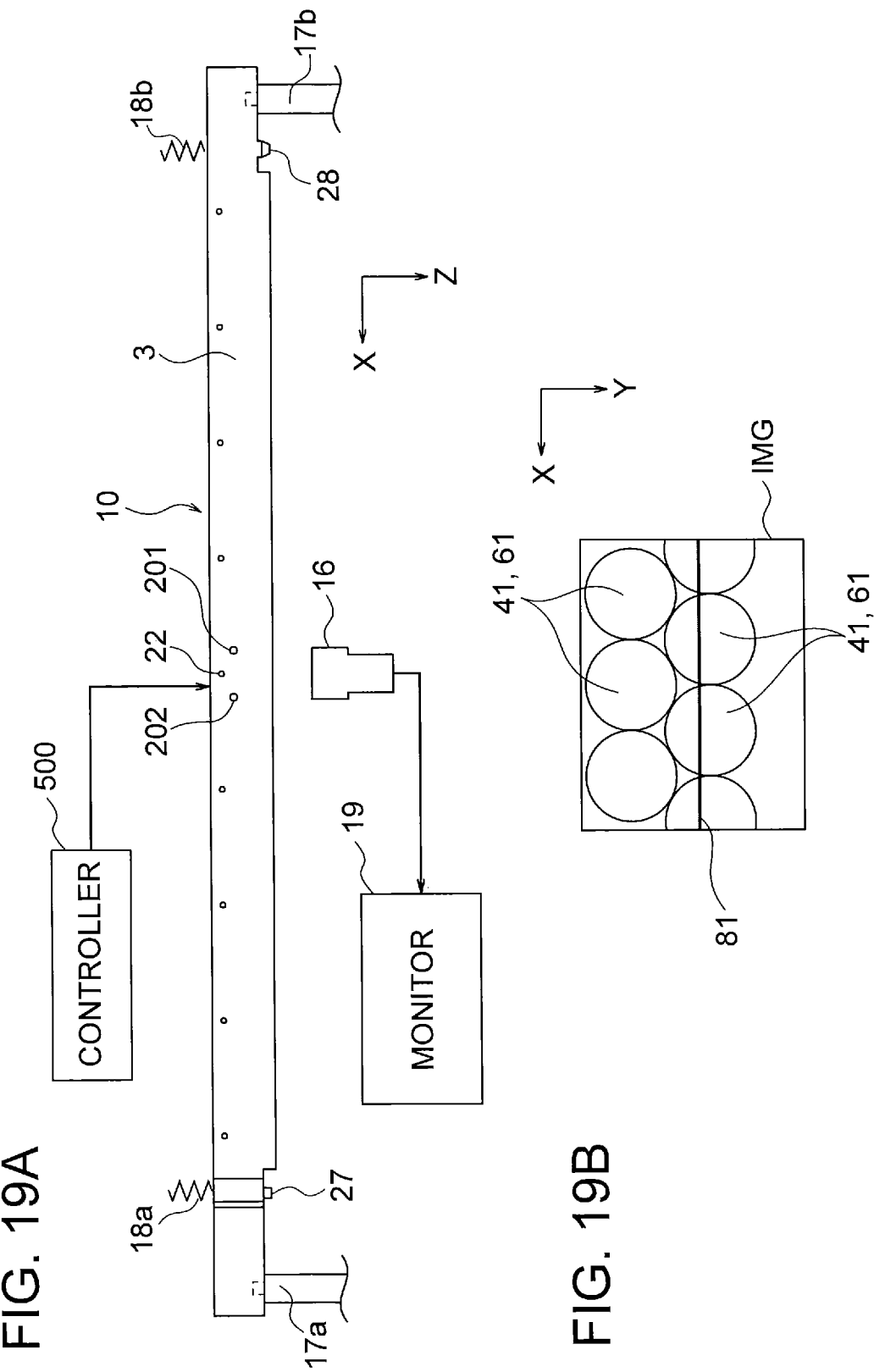
FIGS. 19A and 19B schematically illustrate a method of adjusting the position of the lens unit of the exposure head of the embodiment.

The position of the lens unit L is then adjusted (step S14). FIG. 19A schematically illustrates a method of adjusting the position of the lens unit L. First, the exposure head 10 is attached to two supports 17a and 17b with the cover 3 (FIG. 18) facing downward.

The supports 17a and 17b are, for example, columnar members extending in the Z direction. The supports 17a and 17b support both ends in the X direction of the exposure head 10. The ends in the +Z direction of the supports 17a and 17b are provided with engaging portions, which are indicated by the dash lines in FIG. 19A. The engaging portions of the supports 17a and 17b respectively engage with the hole 25 and the elongated hole 26 (FIG. 3A) of the holder 2 of the exposure head 10.

Biasing members 18a and 18b are disposed on the +Z side relative to the supports 17a and 17b. The biasing members 18a and 18b bias the exposure head 10 in the −Z direction. The biasing members 18a and 18b are, for example, compression coil springs. The biasing members 18a and 18b engage with the two engaging portions 29 (FIG. 3B) of the holder 2. As a result, the exposure head 10 is stably supported on the supports 17a and 17b.

A camera 16 serving as an imaging device is disposed at the substantial center in the X direction of the exposure head 10. The camera 16 captures an image of the exposure head 10 from the −Z side. The image captured by the camera 16 is displayed on a monitor 19.

The substrate 8 of the exposure head 10 is connected to a controller 500 via a flexible cable attached to the connector 83 (FIG. 11E). In accordance with a signal from the controller 500, all the light emitting elements 81 on the substrate 8 emit light.

An operator observes the image captured by the camera 16 on the monitor 19 in a state where the light emitting elements 81 of the substrate 8 emit light.

FIG. 19B schematically illustrates a captured image IMG of the exposure head 10 captured by the camera 16. Since the cover 3 of the exposure head 10 transmits light, the captured image IMG by the camera 16 includes the lens elements 41 of the first lens array 4, the lens elements 61 of the second lens array 6, and the light emitting elements 81 of the substrate 8.

In the example illustrated in FIG. 19B, the lens elements 41 of the first lens array 4 and the lens elements 61 of the second lens array 6 are displaced in the Y direction relative to the light emitting elements 81 of the substrate 8.

In the exposure head 10, the first lens array 4, the intermediate light shielding plate 5, the second lens array 6, and the incident light shielding plate 7 are positioned in the Y direction at both ends in the X direction. Therefore, the center portion in the X direction of the lens unit L (the first lens array 4, the intermediate light shielding plate 5, the second lens array 6, and the incident light shielding plate 7) is deformable in the Y direction. Thus, the position of the lens unit L in the Y direction is adjusted as follows.

Figure 20:
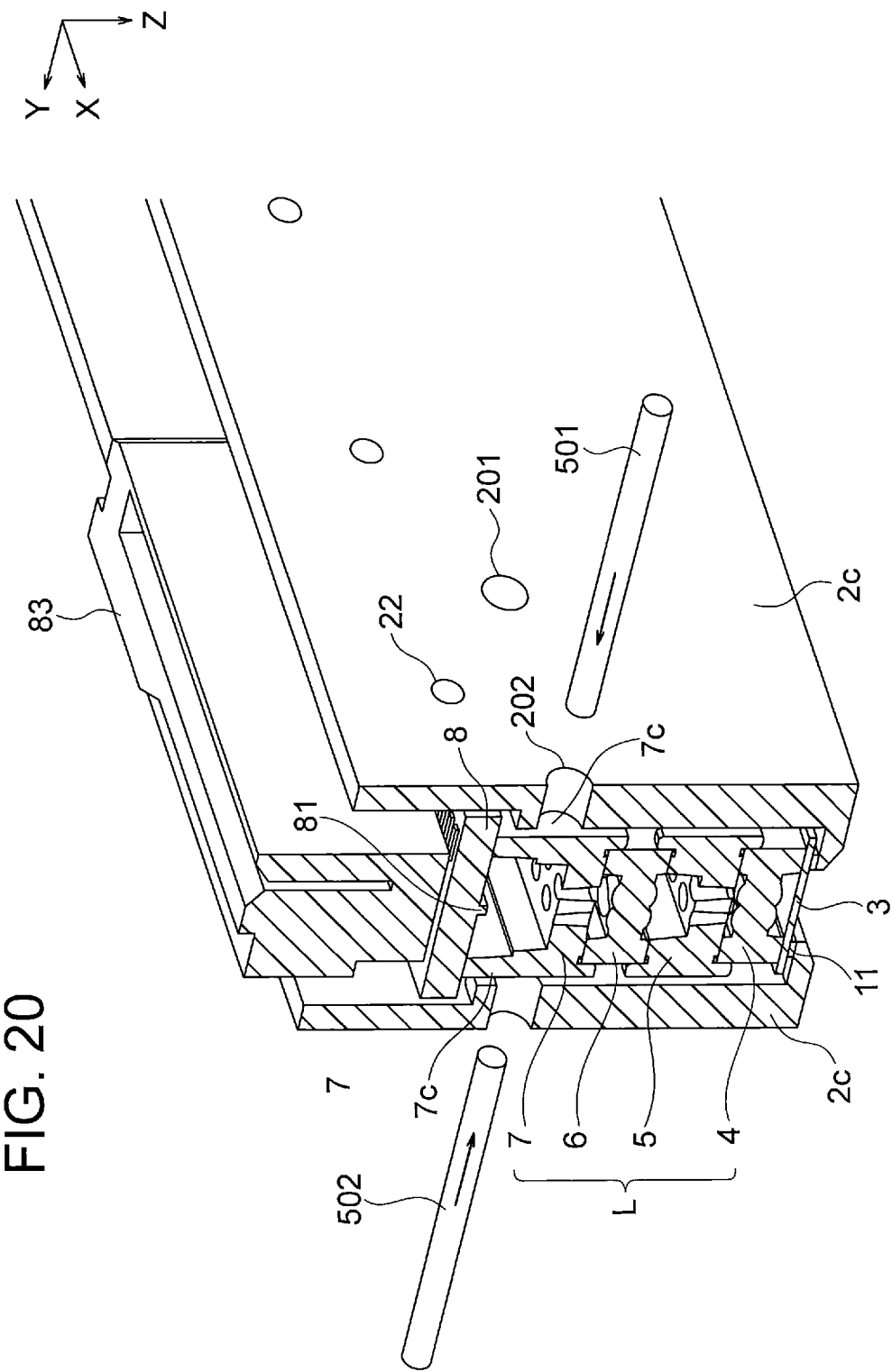
FIG. 20 schematically illustrates a method of adjusting the position of the lens unit of the exposure head of the embodiment.

FIG. 20 schematically illustrates a method of adjusting the position of the lens unit L. Pins 501 and 502 serving as adjusting jigs are inserted through the holes 202 of both sidewalls 2c of the holder 2 to push the side surfaces of the lens unit L from both sides in the Y direction. The displacement (deflecting amount) of the lens unit L in the Y direction can be adjusted by adjusting the pushing amounts of the pins 501 and 502.

The operator observes the captured image IMG captured by the camera 16 on the monitor 19 and adjusts the pushing amounts of the pins 501 and 502 to reduce the misalignment between the lens elements 41 and 61 and the light emitting elements 81.

Figure 21A:
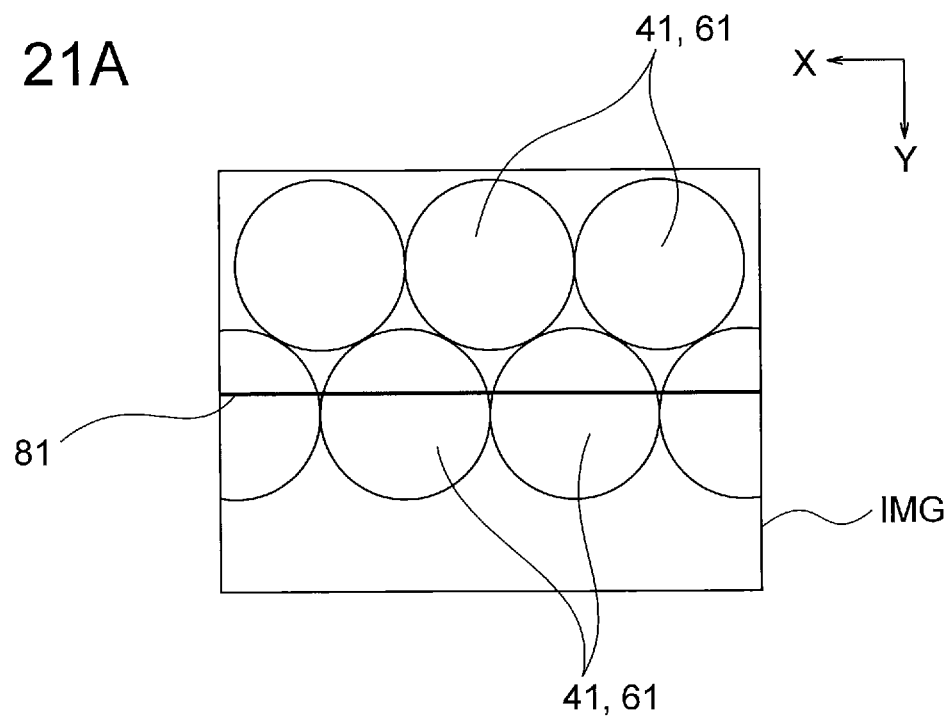
FIGS. 21A and 21B schematically illustrate a method of adjusting the position of the lens unit of the exposure head of the embodiment.

In the captured image IMG illustrated in FIG. 21A, the lens elements 41 of the first lens array 4 and the lens elements 61 of the second lens array 6 are displaced in the −Y direction relative to the light emitting elements 81 of the substrate 8.

Figure 21B:
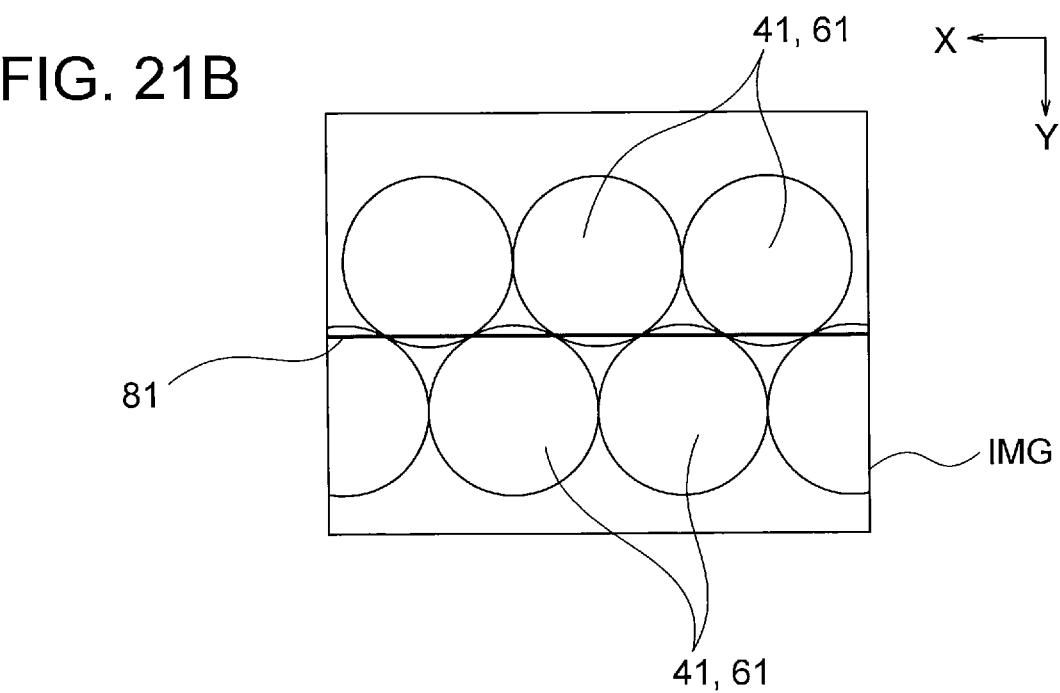

In such the case, the pin 501 is pushed by a larger amount than the pin 502, so that the lens unit L is shifted (deflected) in the +Y direction. This reduces the misalignment between the lens elements 41 and 61 of the lens arrays 4 and 6 and the light emitting elements 81 of the substrate 8, as illustrated in FIG. 21B. In this embodiment, the adjustment width in the Y direction is, for example, approximately 50 μm.

After the position of the lens unit L is adjusted in this way, the adhesive agent 15 (FIG. 2) serving as a fixing member is supplied through the holes 201 of the sidewalls 2c of the holder 2 to the spaces between the lens unit L and the sidewalls 2c (step S15).

The adhesive agent 15 is, for example, a UV curable adhesive agent. After the adhesive agent 15 is supplied through the holes 201 of the holder 2, the adhesive agent 15 is cured by being irradiated with ultraviolet rays through the holes 201. Thus, the side surfaces of the lens unit L are fixed to the sidewalls 2c of the holder 2 by the adhesive agent 15. The adhesive agent 15 is not limited to the ultraviolet curable adhesive agent, but may be any adhesive agent.

Subsequently, the space between the cover 3 and the holder 2 is sealed with the sealing resin 12 (FIG. 4). The insulating film 9 is placed on the substrate 8, and the space between the substrate 8 and the insulating film 9 and the space between the substrate 8 and the holder 2 are sealed with the sealing resin 14 (FIG. 4) (step S16). The holes 202 are closed with the adhesive agent 15 or the like. This completes the assembly of the exposure head 10.

(Operation)

The operation of the exposure head 10 of the embodiment will now be described. In the process of producing the exposure head 10, the light emitting elements 81 may be misaligned in the Y direction with respect to the lens elements 41 of the lens array 4 and the lens elements 61 of the lens array 6 due to positional error in the mounting positions of the light emitting elements 81 on the substrate 8 or some other reason.

Such misalignment may cause unevenness in the light intensity or modulation of transfer function (MTF or resolution) for the respective lens elements. As a result, for example, streaks may be generated in the printed image and degradation of printing quality (image quality) may occur.

According to the embodiment, the lens unit L (the first lens array 4, the intermediate light shielding plate 5, the second lens array 6, and the incident light shielding plate 7) is held between the substrate 8 and the cover 3 in the Z direction and is positioned at both ends in the X direction. That is, after the position of the lens unit L is determined in the X and Z directions, the position of the lens unit L can be adjusted in the Y direction. The lens unit L is fixed to the holder 2 after the position of the lens unit L is adjusted in the Y direction, as described above.

This can reduce the misalignment of the light emitting elements 81 in the Y direction relative to the lens elements 41 of the lens array 4 and the lens elements 61 of the lens array 6. That is, unevenness in the light intensity or MTF can be reduced, and degradation of printing quality can be suppressed.

Since the lens unit L is held between the cover 3 and the substrate 8 in the Z direction, and the center portion in the X direction of the lens unit L is fixed to the holder 2, the first lens array 4, the intermediate light shielding plate 5, the second lens array 6, and the incident light shielding plate 7 can thermally expand or thermally contract about their center portions in the X direction in response to a temperature change. Therefore, even if thermal expansion or thermal contraction occurs, no force acts between the lens unit L and the holder 2, and thereby deformation of the exposure head 10 is prevented.

It is desirable that the holes 201 and 202 are disposed at the substantial center in the X direction of the exposure head 10. The phrase "the substantial center in the X direction" refers to a range having a width of 10% of the total length of the exposure head 10 with respect to the exact center in the X direction of the exposure head 10. That is, in a case where the total length of the exposure head 10 is 200 mm, "the substantial center in the X direction" of the exposure head 10 refers to a range between 10 mm in the +X direction and 10 mm in the −X direction with respect to the exact center in the X direction of the exposure head 10.

Since the position of the lens unit L is restricted in the Y direction by the pins 23 (position-restricting portions) of the holder 2 at both ends in the X direction, the substantial center in the X direction of the lens unit L is displaceable in the Y direction. Therefore, by forming the holes 201 and 202 so as to face the substantial center in the X direction of the lens unit L, the adjustment of the position of the lens unit L is facilitated.

Although the holder 2 has the hole 201 for supplying the adhesive agent 15 and the hole 202 through which the pin 501 (or pin 502) is inserted, the holes 201 and 202 may be replaced with a single hole. In such the case, a pin may be inserted into the single hole and the adhesive agent 15 may be supplied through the periphery of the pin.

Alternatively, it is also possible to provide the holes 210 and 202 on one of the two sidewalls 2c of the holder 2. It is also possible to provide the holes 210 and 202 on one of the two sidewalls 2c of the holder 2, and to provide a single hole on the other of the sidewalls 2c. Further, it is also possible to provide three or more holes on the sidewall 2c.

In this example, the holes 201 and 202 of the holder 2 are formed at positions facing the side surface portions 7c of the incident light shielding plate 7 of the lens unit L.

However, the holes 201 and 202 may be formed at positions facing any component of the lens unit L.

For example, the holes 201 and 202 of the holder 2 may be formed at positions facing the side surface portions 5c of the intermediate light shielding plate 5. In this case, during adjustment of the position of the lens unit L, the pins 501 and 502 inserted into the holes 202 (FIG. 20) to bias the side surface portions 5c of the intermediate light shielding plate 5, and the adhesive agent 15 is supplied through the holes 201. The adhesive agent 15 is cured in the spaces between the side surface portions 5c of the intermediate light shielding plate 5 and the sidewalls 2c of the holder 2.

The holes 201 and 202 have circular shapes in this example, but may have any other shape. The holes 201 and 202 have the same size in this example, but may have different sizes.

In this example, the lens unit L is a stacked body of the first lens array 4, the intermediate light shielding plate 5, the second lens array 6, and the incident light shielding plate 7. The lens unit L is not limited to such a configuration, but may have any other configuration as long as the lens unit L includes a plurality of lens elements arranged in the X direction (the main scanning direction).

Advantageous Effects of Embodiments

As described above, the exposure head 10 (i.e., the optical head) of the embodiment comprises the substrate 8 including the light emitting elements 81 arranged in the X direction, the lens unit L transmitting the light emitted from the light emitting elements 81, and the holder 2 holding the lens unit L. The holder 2 has the sidewall 2c extending in the X direction. The sidewall 2c have the hole 201 at a position facing the lens unit L. The hole 201 is provided with the adhesive agent 15 (the fixing member) for fixing the lens unit L to the sidewall 2c. Therefore, the lens unit L can be bonded to the holder 2 after the position of the lens unit L is adjusted. As a result, misalignment between the light emitting elements 81 on the substrate 8 and the lens elements 41 and 61 of the lens unit L can be reduced, and degradation of the printing quality can be suppressed.

Since the hole 201 is formed at the substantial center in the X direction of the sidewall 2c of the holder 2, the lens unit L can be fixed to the holder 2 after the position of the lens unit L is adjusted at a position (the substantial center in the X direction) where the lens unit L is most deformable.

Since the adhesive agent 15 is used as the fixing member, the lens unit L can be easily fixed to the holder 2 by supplying the adhesive agent 15 to the spaces between the lens unit L and the sidewalls 2c through the holes 201 of the sidewall 2c.

The holder 2 has the two sidewalls 2c facing each other in the Y direction (the sub-scanning direction), and each of the sidewalls 2c has the hole 201. Thus, the lens unit L can be fixed to the sidewalls 2c at both ends in the Y direction. Accordingly, the effect of reducing misalignment between the light emitting elements 81 and the lens elements 41 and 61 can be enhanced.

Since the sidewall 2c of the holder 2 has the hole 202 (the second hole) disposed adjacent to the hole 201 (the first hole), the position of the lens unit L can be adjusted using the pins 501 inserted through the hole 202, and the lens unit L can be bonded with the adhesive agent 15 supplied to the hole 201. That is, the lens unit L can be fixed to the holder 2 after the substrate 8 is positioned and fixed in the Z direction relative to the holder 2.

In this regard, if the substrate 8 is positioned in the Z direction relative to the lens unit L after the lens unit L is fixed to the holder 2, the lens unit L fixed to the holder 2 may interfere with the positioning of the substrate 8.

In the embodiment, the substrate 8 is positioned in the Z direction and fixed to the holder 2, and then the lens unit L is held between the substrate 8 and the holder 2 in the Z direction (thereby the lens unit L is positioned in the Z direction). In this state, the lens unit L is positioned in the Y direction and fixed to the holder 2. Since the substrate 8 can be positioned in the Z direction and the lens unit L can be positioned in the Y direction, effect of suppressing degradation of the printing quality can be enhanced.

Since the projections 24 (the positioning portions) that restrict the position of the lens unit L in the X direction are disposed at the substantial center in the X direction of the holder 2, when the components of the lens unit L thermally expand or thermally contract, the components of the lens unit L are shiftable to both sides in the X direction. Therefore, deformation of the exposure head 10 can be prevented.

Since the pins 23 (the position-restricting portions) that restrict the position of the lens unit L in the Y direction are disposed at both ends in the X direction of the holder 2, the lens unit L can be positioned in the Y direction while allowing displacement of the lens unit L in at center portion in the X direction.

Since the holder 2 has the top plate portion 2a (the supporting portion), the lens unit L is held between the substrate 8 and the cover 3 fixed to the top plate portion 2a. Thus, the lens unit L can be positioned in the Z direction while allowing the adjustment of the position of the lens unit L in the Y direction.

(Configuration of Image Reading Apparatus)

An example in which the optical head of the embodiment is applied to a reading head 90 of an image reading apparatus 200 will now be described.

Figure 22:
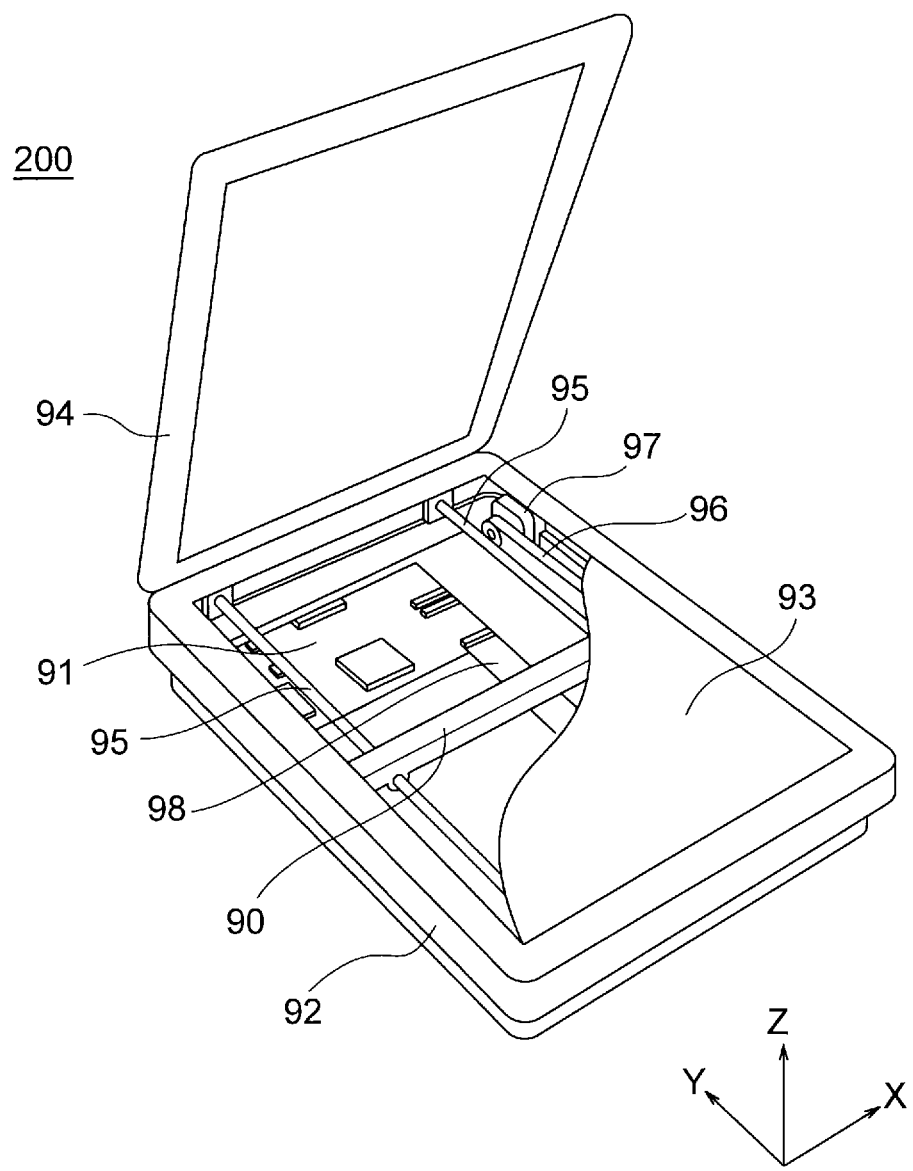
FIG. 22 is a perspective view illustrating an image reading apparatus including a reading head of the embodiment.

FIG. 22 is a perspective view illustrating the image reading apparatus 200. The image reading apparatus 200 is, for example, a flatbed-type image scanner. The image reading apparatus 200 includes a housing 92, a platen (support plate) 93, the reading head 90 (contact image sensor head), and a cover 94. The platen 93 is disposed on the upper side of the housing 92. The reading head 90 serves as an optical head and is disposed below the platen 93. The cover 94 covers the upper side of the platen 93. The platen 93 is composed of material such as glass that transmits visible light. A document to be read (reading object) is placed on the surface of the platen 93.

Figure 23:
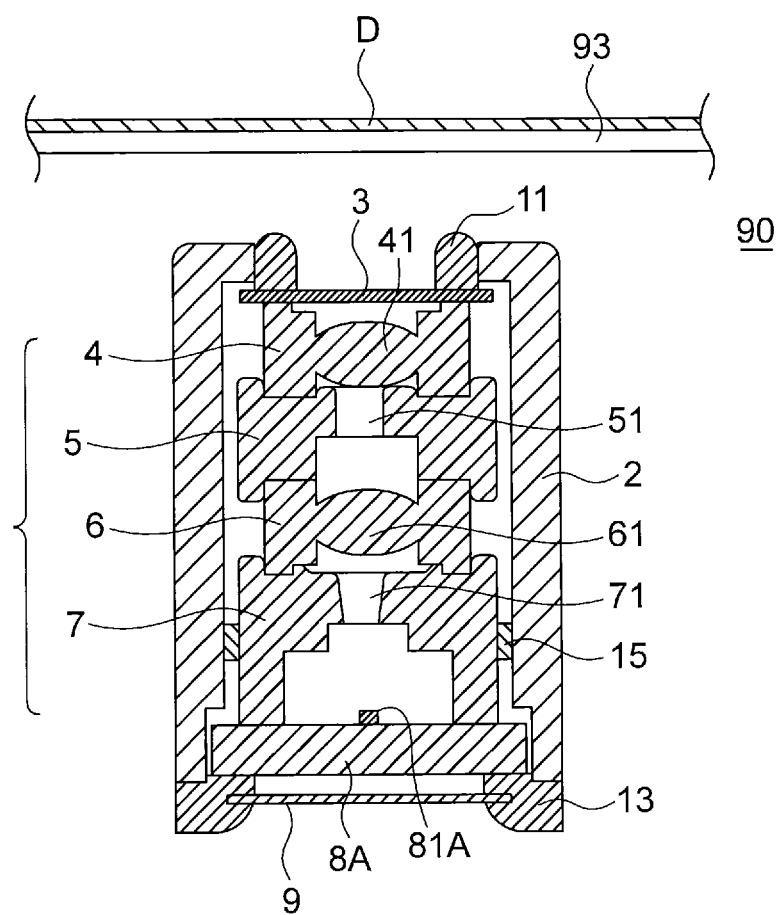
FIG. 23 illustrates the reading head of the embodiment.

FIG. 23 is a cross-sectional view illustrating the configuration of the reading head 90. The reading head 90 includes a substrate 8A (light-receiving element substrate) including light-receiving elements 81A serving as optical elements, in place of the substrate 8 (light emitting element substrate (FIG. 4)) including the light emitting elements 81. The reading head 90 has the same configuration as that of the exposure head 10 except that the substrate 8 is replaced with the substrate 8A.

That is, the reading head 90 includes the holder 2, the cover 3, the first lens array 4, the intermediate light shielding plate 5, the second lens array 6, the incident light shielding plate 7, the substrate 8A, and the insulating film 9. The cover 3 is fixed to the holder 2 with the adhesive agent 11 (FIG. 4), and the substrate 8A is fixed to the holder 2 with the adhesive agent 13 (FIG. 4). The first lens array 4, the intermediate light shielding plate 5, the second lens array 6, and the incident light shielding plate 7 are held between the cover 3 and the substrate 8A so that they are slidable in the X direction.

The reading head 90 is disposed so that the emission side (i.e., the cover 3 side) faces the platen 93. Light from the document D placed on the platen 93 passes through the lens elements 41 of the first lens array 4, the openings 51 of the intermediate light shielding plate 5, the lens elements 61 of the second lens array 6, and the openings 71 of the incident light shielding plate 7, and is focused on the light-receiving elements 81A.

The basic operation of the image reading apparatus 200 is as follows. When the document D to be read is placed on the platen 93 and a switch such as a scan button is depressed, a light source (not illustrated) attached to the reading head 90 is turned on to illuminate the document D. The reading head 90 moves in the Y direction by a drive belt 96 driven by a stepping motor 97, and captures the light reflected by the surface of the document D. The reading head 90 converts the received optical signal into an electrical signal.

Since the reading head 90 has the same features as those of the exposure head 10 described above, misalignment between the light-receiving elements 81A on the substrate 8A and the lens elements 41 and 61 can be reduced, and degradation of the reading quality (image quality) can be suppressed.

Instead of moving the reading head 90 as described above, the document to be read may be transported by an automatic document feeder (ADF) so as to pass through a predetermined reading position on the platen 93, and the image of the document D may be read by the reading head 90 stopped at the reading position.

Although the preferred embodiment has been described above in detail, the present disclosure is not limited to the above described embodiment, and various improvements or modifications can be made thereto.

Examples of the image forming apparatus include a printer, a copying machine, a facsimile machine, and a multifunction peripheral (MFP). Examples of the image reading apparatus include a scanner and a multifunction peripheral.

What is claimed is:

1. An optical head comprising:
   a substrate on which optical elements are arranged in a main scanning direction;
   a lens unit that transmits light emitted from the optical elements or light entering the optical elements; and
   a holder that holds the lens unit,
   wherein the holder includes:
      a sidewall extending in the main scanning direction,
      a supporting portion supporting the lens unit, and being provided at a side of the sidewall in an optical axis direction of the lens unit, the lens unit being held between the supporting portion and the substrate in the optical axis direction, and
      a pair of position-restricting portions respectively disposed at both ends of the lens unit in the main scanning direction, the position-restricting portions restricting the position of the lens unit in a sub-scanning direction perpendicular to the main scanning direction,
   wherein the sidewall has a first hole and a second hole which are adjacent to each other and which are disposed substantially at a center of the sidewall in the main scanning direction, the first hole and the second hole facing the lens unit, and
   wherein a fixing member is provided in the first hole, the fixing member fixing the lens unit to the sidewall.

2. The optical head according to claim 1, wherein the fixing member comprises an adhesive agent.

3. The optical head according to claim 1, wherein the holder has two sidewalls facing each other in the sub-scanning direction perpendicular to the main scanning direction, and
   wherein each of the two sidewalls has the hole.

4. The optical head according to claim 1, wherein the holder comprises a positioning portion that restricts the position of the lens unit in the main scanning direction.

5. The optical head according to claim 4, wherein the positioning portion is disposed at a substantial center of the holder in the main scanning direction.

6. The optical head according to claim 1, further comprising a cover disposed between the supporting portion and the lens unit,
   wherein the lens unit is held between the substrate and the cover in the optical axis direction.

7. The optical head according to claim 1, wherein the lens unit comprises:
   at least one lens array in which lens elements are arranged in the main scanning direction; and
   at least one light shielding member in which openings are arranged in the main scanning direction.

8. An image forming apparatus comprising:
   an exposure head constituted by the optical head according to claim 1;
   an image bearing body provided to face the exposure head;
   a developing portion that develops an image formed on the image bearing body by the exposure head; and
   a transfer portion that transfers the image developed by the developing portion to a medium.

9. An image reading apparatus comprising:
   a reading head constituted by the optical head according to claim 1; and
   a platen that holds a document at a position facing the reading head.

10. A method of producing an optical head comprising a substrate on which a plurality of optical elements is arranged in a main scanning direction, a lens unit transmitting light emitted from the optical elements or light entering the optical elements, and a holder holding the substrate and the lens unit, the method comprising the steps of:
    positioning the lens unit relative to the holder in the main scanning direction;
    fixing the substrate to the holder;
    adjusting a position of the lens unit relative to the holder in a sub-scanning direction perpendicular to the main scanning direction; and
    fixing the lens unit to the holder with a fixing member through a hole provided in the holder,
    wherein the step of adjusting the position of the lens unit includes:
       capturing an image of lens elements of the lens unit and the optical elements on the substrate using an imaging device; and
       adjusting the position of the lens element to reduce misalignment between the lens elements and the optical elements.

11. The method according to claim 10, wherein the step of adjusting the position of the lens unit comprises:

capturing an image of a substantial center of the lens unit in the main scanning direction using the imaging device; and biasing the substantial center in the main scanning direction of the lens unit in the sub-scanning direction.

12. The method according to claim 10, wherein the fixing member comprises an adhesive agent.

13. The method according to claim 10, A method of producing an optical head comprising a substrate on which a plurality of optical elements is arranged in a main scanning direction, a lens unit transmitting light emitted from the optical elements or light entering the optical elements, and a holder holding the substrate and the lens unit, the method comprising the steps of:

positioning the lens unit relative to the holder in the main scanning direction;

fixing the substrate to the holder;

adjusting a position of the lens unit relative to the holder in a sub-scanning direction perpendicular to the main scanning direction; and fixing the lens unit to the holder with a fixing member through a hole provided in the holder, wherein the step of adjusting the position of the lens unit comprises adjusting the position of the lens unit in the sub-scanning direction using a jig inserted through a hole provided in the holder.

14. The method according to claim 13, wherein the hole through which the fixing member is supplied in the step of fixing the lens unit to the holder is a first hole, and wherein the hole through which the jig is inserted in the step of adjusting the position of the lens unit is a second hole different from the first hole.

* * * * *